United States Patent
Fukui et al.

(10) Patent No.: US 12,384,857 B2
(45) Date of Patent: Aug. 12, 2025

(54) CELLULOSE FIBER COMPOSITE

(71) Applicant: KAO CORPORATION, Tokyo (JP)

(72) Inventors: Shunsuke Fukui, Tokyo (JP); Yutaka Yoshida, Wakayama (JP); Minato Nakamura, Wakayama (JP); Shotaro Shibata, Wakayama (JP)

(73) Assignee: KAO CORPORATION, Tokyo (JP)

( * ) Notice: Subject to any disclaimer, the term of this patent is extended or adjusted under 35 U.S.C. 154(b) by 548 days.

(21) Appl. No.: 17/795,903

(22) PCT Filed: Jan. 29, 2021

(86) PCT No.: PCT/JP2021/003123
§ 371 (c)(1),
(2) Date: Jul. 28, 2022

(87) PCT Pub. No.: WO2021/153699
PCT Pub. Date: Aug. 5, 2021

(65) Prior Publication Data
US 2023/0118481 A1    Apr. 20, 2023

(30) Foreign Application Priority Data

Jan. 30, 2020  (JP) .................. 2020-014167
Jan. 30, 2020  (JP) .................. 2020-014170

(51) Int. Cl.
| | | |
|---|---|---|
| C08B 15/06 | (2006.01) | |
| C08L 1/02 | (2006.01) | |
| D06M 15/53 | (2006.01) | |
| D06M 15/70 | (2006.01) | |
| D06M 101/06 | (2006.01) | |

(52) U.S. Cl.
CPC ............... *C08B 15/06* (2013.01); *C08L 1/02* (2013.01); *D06M 15/53* (2013.01); *D06M 15/70* (2013.01); C08L 2205/16 (2013.01); D06M 2101/06 (2013.01)

(58) Field of Classification Search
CPC ........ C08B 15/06; C08L 1/02; C08L 2205/16; D06M 15/53; D06M 15/70; D06M 2101/06
See application file for complete search history.

(56) References Cited

U.S. PATENT DOCUMENTS

| | | | |
|---|---|---|---|
| 10,961,425 B2 * | 3/2021 | Yoshida | E21B 43/25 |
| 11,591,481 B2 * | 2/2023 | Mizukami | C08L 1/02 |
| 2016/0319467 A1 * | 11/2016 | Yamato | C08G 81/00 |
| 2016/0340827 A1 | 11/2016 | Yamato et al. | |
| 2019/0225712 A1 | 7/2019 | Yamato et al. | |
| 2021/0087713 A1 | 3/2021 | Fukui et al. | |

FOREIGN PATENT DOCUMENTS

| | | |
|---|---|---|
| CN | 105073784 A | 11/2015 |
| CN | 105121734 A | 12/2015 |
| CN | 107620211 A | 1/2018 |
| CN | 109563177 A | 4/2019 |
| CN | 111511980 A | 8/2020 |
| JP | 2010070507 A | 4/2010 |
| JP | 2010168572 A | 8/2010 |
| JP | 2012126786 A | 7/2012 |
| JP | 2016183329 A | 10/2016 |
| JP | 2017019896 A | 1/2017 |
| JP | 2019119867 A | 7/2019 |
| JP | 2020158764 A | 10/2020 |
| WO | WO-2012091050 A1 | 7/2012 |

OTHER PUBLICATIONS

International Search Report issued Mar. 23, 2021 in PCT/JP2021/003123 (with English translation), 5 pages.
Extended European Search Report issued Jan. 18, 2024 in corresponding European Patent Application No. 21747124.2, 8 pages.
Endo, Takashi et al., "Microparticle formation behavior of cellulose fibers by mechanical grinding", Kobunshi Ronbunshu, Mar. 1999, vol. 56, No. 3, p. 166-173 (with machine English translation).

* cited by examiner

*Primary Examiner* — Robert S Jones, Jr.
*Assistant Examiner* — Elizabeth Amato
(74) *Attorney, Agent, or Firm* — Element IP, PLC

(57) ABSTRACT

The invention relates to [1] a cellulose fiber composite excellent in dispersion stability, in which at least one amine selected from a polyamine and a monoamine having a reactive functional group bonds to anion-modified cellulose fibers, and which satisfies at least one of amine introduction ratio of 60% or less (requirement 1) and average polymerization degree of anion-modified cellulose fibers of 300 or less (requirement 2), [2] a dispersion in which the cellulose fiber composite is dispersed in a medium, [3] a resin composition produced by blending the cellulose fiber composite and a resin, [4] a molded article produced by molding the cellulose fiber composite or the resin composition, and [5] a method for producing the cellulose fiber composite.

20 Claims, No Drawings

CELLULOSE FIBER COMPOSITE

TECHNICAL FIELD

The present invention relates to a cellulose fiber composite, a dispersion containing it, a resin composition, a molded article, and a method for producing a cellulose fiber composite.

BACKGROUND ART

Heretofore, plastic materials derived from limited resource petroleum have been widely used, however, in the recent years, techniques with less burdens on the environment have become spotlighted. In view of the technical background, cellulose fibers that are biomass existing in nature in large amounts have been remarked, as recyclable and biodegradable by microorganisms to cause less environmental load, and as having excellent mechanical properties.

Usually, when cellulose fibers are dried, enormous hydrogen bonds are formed between the fibers, thereby aggregating the cellulose fibers. As a result, it would be difficult to disperse the dried cellulose fibers in a medium such as water or an organic solvent. In that sense, it can be said that dried cellulose fibers are materials that are inconvenient to use.

In particular, the surfaces of cellulose fibers are hydrophilic, and therefore when a dispersion medium or a resin is hydrophobic, cellulose fibers may readily aggregate therein and the dispersibility thereof in the dispersion medium or the resin lowers. Accordingly, for blending cellulose fibers in a resin to thereby reinforce the mechanical properties thereof and the like, the dispersibility of cellulose fibers therein needs to be increased.

In general, in a field of a coating material, an ink or the like having a small viscosity, viscosity increase with an organic medium is often required.

Further, it is also important to introduce a specific reactive functional group to cellulose fibers to enhance the compatibility with a resin or to impart specific functions.

Simultaneously, from the viewpoint of development of applications, cellulose fibers which do not deteriorate transparency when blended in a dispersion medium or a resin have been demanded.

Heretofore, various proposals have been made for (1) a technique relating to dispersibility and viscose increase of cellulose fibers in a dispersion medium or a resin, and (2) a technique relating to dispersibility of cellulose fibers in a dispersion medium or a resin, introduction of a reactive functional group thereinto, and transparency thereof.

JP2010-168572A (PTL 1) discloses a gas barrier material which contains cellulose fibers having an average fiber diameter of 200 nm or less and a crosslinking agent having a reactive functional group, and in which the carboxy group content of the cellulose that constitutes the cellulose fibers is 0.1 to 2 mmol/g, as a gas barrier molded article having high permeation inhibition performance against oxygen gas, water vapor and the like.

JP2016-183329A (PTL 2) discloses a water-based composition which undergoes little viscosity reduction at high temperatures, which contains (A) fine cellulose fibers having a number-average fiber diameter of 0.5 to 200 nm and a carboxy group content of 0.1 mmol/g or more, where the carboxy group is in the form of an alkali metal salt, and (B) a compound having a ratio of (carbon atom number/nitrogen atom number) per one molecule of 3 to 45, as an additive, and which contains the component (A) and the component (B) in a specific ratio and has a specific viscosity.

JP2017-19896A (PTL 3) discloses, as a gel composition excellent in dispersibility and viscosity, a gel composition containing (A) cellulose nanofibers having a maximum fiber diameter of 1000 nm or less and a number-average fiber diameter of 2 to 150 nm, where the cellulose have a cellulose I-type crystal structure, the C6-positioned hydroxy group in the glucose unit in the cellulose molecule is selectively oxidation-modified to be a carboxy group or the like, and the carboxy group is ion-bonded to the amino group of a polyether amine, and (B) an organic solvent.

SUMMARY OF INVENTION

The present invention relates to a cellulose fiber composite, in which at least one amine selected from a polyamine and a monoamine having a reactive functional group bonds to anion-modified cellulose fibers, and which satisfies at least one of the following requirements 1 and 2:

Requirement 1: The amine introduction ratio represented by the following formula (1) is 60% or less, $$\text{Amine introduction ratio (\%)} = [\text{amount of amine bonding to the anionic group introduced into the cellulose fibers (mmol/g)/content of the anionic group introduced into the cellulose fibers (mmol/g)}] \times 100 \quad (1)$$

Requirement 2: The average polymerization degree of the anion-modified cellulose fibers is 300 or less.

DESCRIPTION OF EMBODIMENTS

However, cellulose fibers having further better dispersion stability than cellulose that has been obtained in conventional techniques are desired. More specifically, desired are (1) cellulose fibers further more excellent in dispersion stability and viscosity increase performance, and (2) cellulose fibers further more excellent in dispersion stability and transparency of dispersions.

The present invention relates to a cellulose fiber composite excellent in dispersion stability, more specifically, to (1) a cellulose fiber composite excellent in dispersion stability and in viscosity increase performance, and (2) a cellulose fiber composite excellent in dispersion stability and capable of providing a dispersion excellent in transparency, as well as a dispersion, a resin composition and a molded article containing them, and a method for producing a cellulose fiber composite.

The present inventors have found that the above-mentioned problems can be solved by (1) bonding, to anion-modified cellulose fibers, at least one amine selected from a polyamine and a monoamine having a reactive functional group in an introduction ratio of 60% or less, and complexing them, or (2) combining and complexing an anion-modified cellulose fiber having an average polymerization degree of 300 or less, and at least one amine selected from a polyamine and a monoamine having a reactive functional group.

Specifically, the present invention relates to the following [1] to [5]. [1] A cellulose fiber composite, in which at least one amine selected from a polyamine and a monoamine having a reactive functional group bonds to anion-modified cellulose fibers, and which satisfies at least one of the following requirements 1 and 2:

Requirement 1: The amine introduction ratio represented by the following formula (1) is 60% or less, Amine introduction ratio (%)=[amount of amine bonding to the anionic group introduced into the cellulose fibers (mmol/g)/content of the anionic group introduced into the cellulose fibers (mmol/g)]×100   (1)

Requirement 2: The average polymerization degree of the anion-modified cellulose fibers is 300 or less.

[2] A dispersion in which the cellulose fiber composite of the above [1] is dispersed in a medium.

[3] A resin composition produced by blending the cellulose fiber composite of the above [1] and a resin.

[4] A molded article produced by molding the cellulose fiber composite of the above [1] or the resin composition of the above [3].

[5] A method for producing the cellulose fiber composite of the above [1], including mixing anion-modified cellulose fibers and at least one amine selected from a polyamine and a monoamine having a reactive functional group.

According to the present invention, there can be provided a cellulose fiber composite excellent in dispersion stability, more specifically, (1) a cellulose fiber composite excellent in dispersion stability and in viscosity increase performance, and (2) a cellulose fiber composite excellent in dispersion stability and capable of providing a dispersion excellent in transparency, as well as a dispersion, a resin composition and a molded article excellent in mechanical strength containing them, and a method for producing a cellulose fiber composite.

[Cellulose Fiber Composite]

The cellulose fiber composite of the present invention is a cellulose fiber composite in which at least one amine selected from a polyamine and a monoamine having a reactive functional group bonds to anion-modified cellulose fibers, and which satisfies at least one of the following requirements 1 and 2:

Requirement 1: The amine introduction ratio represented by the following formula (1) is 60% or less, Amine introduction ratio (%)=[amount of amine bonding to the anionic group introduced into the cellulose fibers (mmol/g)/content of the anionic group introduced into the cellulose fibers (mmol/g)]×100   (1)

Requirement 2: The average polymerization degree of the anion-modified cellulose fibers is 300 or less.

Hereinunder the invention satisfying the requirement 1 is referred to as the first aspect of the invention, and the invention satisfying the requirement 2 is referred to as the second aspect of the invention. The present invention includes the first aspect of the invention and the second aspect of the invention, and the description with no specific and explicit expression of the first aspect of the invention and the second aspect of the invention is a description relating to the matters common to the first aspect of the invention and the second aspect of the invention.

The cellulose fiber composite of the first aspect of the invention is excellent in dispersion stability and viscosity increase performance, and the cellulose fiber composite of the second aspect of the invention is excellent in dispersion stability and capable of providing a dispersion excellent in transparency. Though not clear, the reason is considered as follows.

(1) Regarding the First Aspect of the Invention:

In general, a reactive functional group has a high polarity and has a property capable of interacting with any other structure, and therefore it is considered that in complexation with anion-modified cellulose fibers so as to have an introduction ratio of 60% or less, the functional group would appropriately weaken the interaction between the cellulose fibers. As a result, it is considered that the cellulose fibers do not aggregate and the compatibility thereof with a medium improves so that the dispersion stability of the cellulose fiber composite improves and the viscosity increase performance thereof can also increase.

(2) Regarding the Second Aspect of the Invention:

In general, when a reactive functional group capable of interacting with cellulose fibers is introduced into cellulose fibers, the cellulose fibers aggregate together and the dispersion stability thereof worsens. Here, when anion-modified cellulose fibers having an average polymerization degree of 300 or less are used, it is considered that the dispersibility thereof could increase since the crosslinking number per fiber decreases. As a result, it is considered that the cellulose fibers do not aggregate and the compatibility thereof with a medium improves so that the dispersion stability of the cellulose fiber composite improves, and the transparency of the dispersion, the resin composition and the molded article to be obtained can be also excellent.

<Anion-Modified Cellulose Fibers>

"Anion-modified cellulose fibers" for use in the present invention are cellulose fibers that have been anion-modified so as to contain an anionic group in the cellulose fibers.

The average fiber length or the like of the anion-modified cellulose fibers differs, depending on the production method. For example, in the case where the anion-modified cellulose fibers are not subjected to a fiber-shortening treatment, a preferred range of the average fiber length or the like of the fibers is the same as that of the raw material cellulose fibers. In the case where the anion-modified cellulose fibers are subjected to a fiber-shortening treatment, a preferred range of the average fiber length or the like of the fibers is the same as that of the shortened cellulose fibers to be mentioned hereinunder.

(Average Polymerization Degree)

In the case of the first aspect of the invention, the average polymerization degree of the anion-modified cellulose fibers is, from the viewpoint of the dispersion stability and of providing a molded article excellent in mechanical strength, preferably 30 or more, more preferably 50 or more, even more preferably 60 or more, further more preferably 70 or more, further more preferably 80 or more, and is, from the viewpoint of improving the dispersion stability, preferably 700 or less, more preferably 500 or less, even more preferably 400 or less, and is, from the viewpoint of improving the transparency, preferably 300 or less, more preferably 250 or less, even more preferably 200 or less, further more preferably 180 or less.

In the case of the second aspect of the invention, the average polymerization degree of the anion-modified cellulose fibers is, from the viewpoint of providing a molded article excellent in mechanical strength, preferably 30 or more, more preferably 50 or more, even more preferably 60 or more, further more preferably 70 or more, further more preferably 80 or more, and is, from the viewpoint of improving the transparency and the dispersion stability, 300 or less, preferably 250 or less, more preferably 200 or less, even more preferably 180 or less. From the above-mentioned viewpoint, the average polymerization degree of the anion-modified cellulose fibers is preferably 30 or more and 300 or less, more preferably 50 or more and 300 or less, even more preferably 50 or more and 250 or less.

When the average polymerization degree of the anion-modified cellulose fibers is controlled to be 300 or less, dispersion stability and transparency can be improved, irrespective of the introduction ratio of at least one amine selected from a polyamine and a monoamine having a reactive functional group into the anionic group of the cellulose fibers.

The average polymerization degree of cellulose fibers can be measured according to the method described in the section of Examples.

As the cellulose fibers, commercial cellulose fibers whose average polymerization degree falls within the above range can be used as they are, or a cellulose raw material whose average polymerization degree is more than the range may be appropriately treated prior to use so as to control the average polymerization degree thereof. Also, a cellulose raw material whose average polymerization degree is more than the range is used, and may be anion-modified while it is treated appropriately, or a cellulose raw material whose average polymerization degree falls within the range may be appropriately treated so as to change the average polymerization degree thereof.

In the case where the average polymerization degree of cellulose fibers is changed, the cellulose fibers are subjected to at least one treatment selected from the group consisting of (i) alkali treatment, (ii) acid treatment, and (iii) heat treatment, UV treatment, electronic beam treatment, mechanical treatment and enzymatic treatment, like the fiber-shortening treatment to be mentioned hereinunder.

(Introduction of Anionic Group)

Examples of the anionic group contained in the anion-modified cellulose fibers include a carboxy group, a sulfonic acid group and a (phosphorus or) phosphoric acid group, and from the viewpoint of the introduction efficiency into cellulose fibers, preferred is a carboxy group.

In the case of the first aspect of the invention, the content of the anionic group in the anion-modified cellulose fibers is, from the viewpoint of improving viscosity increase performance and dispersion stability, preferably 0.1 mmol/g or more, more preferably 0.2 mmol/g or more, even more preferably 0.5 mmol/g or more, further more preferably 0.8 mmol/g or more, and is preferably 3 mmol/g or less, more preferably 2 mmol/g or less, even more preferably 1.8 mmol/g or less. "mmol/g" means a molar number of the anionic group per gram of anion-modified cellulose fibers, and is before introduction of the modifying group to be mentioned hereinunder. The same shall apply hereinunder.

In the case of the second aspect of the invention, the content of the anionic group in the anion-modified cellulose fibers is, from the viewpoint of improving transparency and dispersion stability, preferably 0.1 mmol/g or more, more preferably 0.2 mmol/g or more, even more preferably 0.5 mmol/g or more, further more preferably 0.8 mmol/g or more, and is preferably 3 mmol/g or less, more preferably 2 mmol/g or less, even more preferably 1.8 mmol/g or less.

From the above viewpoint, in the present invention, the content of the anionic group in the anion-modified cellulose fibers is preferably 0.1 mmol/g or more and 3 mmol/g or less, more preferably 0.2 mmol/g or more and 2 mmol/g or less, even more preferably 0.5 mmol/g or more and 1.8 mmol/g or less.

In order to control the content of the anionic group to fall within the above range, for example, the treatment condition for acid treatment is controlled, or reduction treatment is applied to the fibers for the desired control.

The content of the anionic group means the total amount of the anionic group in the cellulose fibers constituting anion-modified cellulose fibers, and can be measured according to the method described in the section of Examples.

The anion-modified cellulose fibers can be produced, by processing the target cellulose fibers for acid treatment or anionic group addition treatment to thereby introduce at least one or more anionic group thereinto. The kind of the anionic group is one kind or two or more kinds.

The cellulose fibers targeted for anion-modification include the following (A) and (B).

(A) Raw material cellulose fibers.

(B) Shortened cellulose fibers produced by processing raw material cellulose fibers for fiber-shortening treatment.

Among these, from the viewpoint of the introduction efficiency into cellulose fibers and from the viewpoint of load reduction in production, preferred are the raw material cellulose fibers of (A).

(A) Raw Material Cellulose Fibers

As the raw material cellulose fibers, it is preferable to use natural cellulose fibers, from the viewpoint of environmental load reduction. Examples of the natural cellulose fibers include those from wooden pulp such as pulp from needle-leaf trees and pulp from broad-leaf trees; cotton pulp such as cotton linter and cotton lint; non-wooden pulp such as straw pulp and bagasse pulp; and bacteria cellulose.

These raw material cellulose fibers can be used alone or in a combination of two or more kinds.

The average fiber length of the raw material cellulose fibers is, from the viewpoint of availability and cost reduction, preferably 800 μm or more, more preferably 1,000 μm or more, even more preferably 1,500 μm or more, and is preferably 10,000 μm or less, more preferably 5,000 μm or less, even more preferably 3,000 μm or less.

The average fiber diameter of the raw material cellulose fibers is, from the viewpoint of availability and cost reduction, preferably 5 μm or more, more preferably 10 μm or more, even more preferably 20 μm or more, and is preferably 300 μm or less, more preferably 100 μm or less, even more preferably 80 μm or less.

The average aspect ratio of the raw material cellulose fibers is, from the viewpoint of availability and cost reduction, preferably 5 or more, more preferably 10 or more, even more preferably 15 or more, and is preferably 200 or less, more preferably 100 or less, even more preferably 80 or less.

The average fiber length, the average fiber diameter and the average aspect ratio of cellulose fibers can be measured according to the methods described in the section of Examples.

(B) Shortened Cellulose Fibers Produced by Processing Raw Material Cellulose Fibers for Fiber-Shortening Treatment The cellulose fibers to be targeted for fiber-shortening treatment include the following (B1) to (B3).

(B1) Raw material cellulose fibers.

The raw material cellulose fibers are the same as the raw material cellulose fibers of (A).

(B2) Anion-modified cellulose fibers produced by introducing an anionic group into raw material cellulose fibers.

(B3) Modified cellulose fibers produced by introducing an anionic group into raw material cellulose fibers and further introducing a modifying group thereinto.

Among these, from the viewpoint of improving dispersion stability, and from the viewpoint of improving fiber shortening efficiency, (B2) anion-modified cellulose fibers are preferred as the cellulose fibers to be targeted for fiber-shortening treatment.

(Method for Introducing an Anionic Group into Raw Material Cellulose Fibers)

Examples of the method for introducing an anionic group into cellulose fibers include the following (b1) to (b3).

(b1) Method of oxidatively treating the hydroxy group in cellulose to convert it into a carboxy group.

(b2) Method of reacting the hydroxy group of cellulose with at least one selected from the group consisting of a carboxy group-having compound, an acid anhydride thereof, and derivatives thereof.

(b3) Method of introducing a sulfonic acid group or a (phosphorus or) phosphoric acid group into cellulose fibers.

Among these, the method of (b1) is preferred.

(b1) Method of Oxidatively Treating the Hydroxy Group in Cellulose to Convert it into a Carboxy Group The method of oxidatively treating the hydroxy group in cellulose is not specifically limited. One example is a method of oxidative treatment by reaction with an oxidizing agent such as sodium hypochlorite and a bromide such as sodium bromide using 2,2,6,6-tetramethyl-1-piperidine-N-oxyl (TEMPO) as a catalyst. In more detail, referred to is the method described in JP2011-140632A.

By oxidative treatment of cellulose fibers using TEMPO as a catalyst, the hydroxymethyl group (—CH$_2$OH) at the C6-position of the cellulose structural unit is selectively converted into a carboxy group. Especially the method is advantageous in that it is excellent in selectivity of the C6-positioned hydroxy group that is to be oxidized in the raw material cellulose fibers, and that the reaction condition is mild.

Accordingly, one preferred embodiment of the anion-modified cellulose fibers includes TEMPO oxidation-derived ones, that is, cellulose fibers in which the C6-position of the cellulose structural unit is a carboxy group (hereinafter also referred to as "oxidized cellulose fibers").

(b2) Method of Reacting the Hydroxy Group of Cellulose with at Least One Selected from the Group Consisting of a Carboxy Group-Having Compound, an Acid Anhydride Thereof, and Derivatives Thereof The carboxy group-having compound is not specifically limited. Examples thereof include a halogenoacetic acid, and more specifically chloroacetic acid.

The acid anhydride of the carboxy group-having compound and derivatives thereof are not also specifically limited. Examples thereof include acid anhydrides of dicarboxylic acid compounds, such as maleic anhydride, succinic anhydride, phthalic anhydride, and adipic anhydride, and imidated compounds of acid anhydrides of carboxy group-having compounds, and derivatives of acid anhydrides of carboxy group-having compounds. These compounds may be substituted with a hydrophobic group.

(b3) Method of Introducing a Sulfonic Acid Group or a (Phosphorus or) Phosphoric Acid Group into Cellulose Fibers The method of introducing a sulfonic acid group into cellulose fibers includes a method of adding sulfuric acid to cellulose fibers and heating them.

The method of introducing a (phosphorus or) phosphoric acid group into cellulose fibers includes a method of mixing a powder or an aqueous solution of phosphoric acid or a phosphoric acid derivative into cellulose fibers in a dry state or in a wet state, and a method of adding an aqueous solution of phosphoric acid or a phosphoric acid derivative to a dispersion of cellulose fibers.

When these methods are employed, in general, the system is dehydrated or heated after admixture or addition of a powder or an aqueous solution of phosphoric acid or a phosphoric acid derivative.

(Anion-Modified Cellulose Fibers and Anion-Modified Cellulose Fibers after Fiber-Shortening Treatment)

In the present invention, the average fiber length of the anion-modified cellulose fibers is, from the viewpoint of obtaining a molded article excellent in mechanical strength, preferably 1 μm or more, more preferably 5 μm or more, even more preferably 10 μm or more, and is, from the viewpoint of dispersion stability, transparency and viscosity increase performance, preferably 2500 μm or less, more preferably 1000 μm or less, even more preferably 500 μm or less, further more preferably 400 μm or less, further more preferably 300 μm or less. From the above viewpoint, the average fiber length of the anion-modified cellulose fibers is preferably 1 μm or more and 2500 μm or less, more preferably 1 μm or more and 1000 μm or less, even more preferably 1 μm or more and 500 μm or less, further more preferably 5 μm or more and 400 μm or less, further more preferably 10 μm or more and 300 μm or less.

In the present invention, the average fiber diameter of the anion-modified cellulose fibers is, from the viewpoint of obtaining a molded article excellent in mechanical strength, preferably 5 μm or more, more preferably 10 μm or more, even more preferably 20 μm or more, and is, from the viewpoint of dispersion stability, transparency and viscosity increase performance, preferably 300 μm or less, more preferably 100 μm or less, even more preferably 80 μm or less. From the above viewpoint, the average fiber diameter of the anion-modified cellulose fibers is preferably 5 μm or more and 300 μm or less, more preferably 10 μm or more and 100 μm or less.

In the present invention, the average aspect ratio of the anion-modified cellulose fibers is, from the viewpoint of obtaining a molded article excellent in mechanical strength, preferably 2 or more, more preferably 3 or more, even more preferably 5 or more, further more preferably 10 or more, further more preferably 15 or more, and is, from the viewpoint of dispersion stability, transparency and viscosity increase performance, preferably 200 or less, more preferably 100 or less, even more preferably 80 or less. From the above viewpoint, the average aspect ratio of the anion-modified cellulose fibers is preferably 2 or more and 200 or less, more preferably 3 or more and 100 or less.

The average fiber length, the average fiber diameter and the average aspect ratio of the anion-modified cellulose fibers and the anion-modified cellulose fibers that have been processed for fiber-shortening treatment can be measured according to the methods described in the section of Examples.

Regarding the fiber shortening treatment, raw material cellulose fibers are processed for fiber-shortening treatment to give shortened cellulose fibers, and then an anionic group may be introduced into the shortened cellulose fibers to give anion-modified cellulose fibers. The fiber-shortening treatment can be positioned as a pretreatment before the disintegration treatment to be mentioned hereinunder. In the case where the fiber length of the raw material cellulose fibers is 1,000 μm or less, the fiber-shortening treatment can be omitted.

For the fiber-shortening treatment, the targeted cellulose fibers can be subjected to at least one treatment selected from the group consisting of (i) alkali treatment, (ii) acid treatment, and (iii) heat treatment, UV treatment, electronic beam treatment, mechanical treatment and enzymatic treatment.

One example of the alkali treatment method (i) includes preparing a solution or a dispersion of the targeted cellulose fibers having a solid content of the fibers of preferably 0.1% by mass or more and 10% by mass or less and having a pH of preferably 8.0 or more and 15.0 or less, followed by heating the solution or the dispersion under the condition at preferably 60° C. or higher and 110° C. or lower and for 30 minutes or more and 240 minutes or less.

The medium for the solution or the dispersion for the alkali treatment is preferably water, or ethanol. The alkali usable for pH control is preferably sodium hydroxide or potassium hydroxide.

The solution or the dispersion may contain hydrogen peroxide in an amount of preferably 0.5 parts by mass or more and 2.5 parts by mass or less relative to 100 parts by mass of the anionic group-containing cellulose fibers.

One example of the acid treatment method (ii) includes preparing a solution or a dispersion of the targeted cellulose fibers having a solid content of the fibers of preferably 0.1% by mass or more and 10% by mass or less and having a pH of preferably 0.1 or more and 4.0 or less, followed by heating the solution or the dispersion under the condition at preferably 80° C. or higher and 120° C. or lower and for 5 minutes or more and 240 minutes or less.

The medium for the solution or the dispersion for the acid treatment is preferably water, or ethanol. As the acid usable for pH control, preferred are an inorganic acid such as hydrochloric acid, sulfuric acid, nitric acid and phosphoric acid, and an organic acid such as acetic acid, citric acid and malic acid, more preferred are hydrochloric acid, sulfuric acid, nitric acid, phosphoric acid, acetic acid and citric acid, and even more preferred is hydrochloric acid.

One example of the heat treatment (iii) includes preparing a solution or a dispersion of the targeted cellulose fibers having a solid content of the fibers of preferably 0.1% by mass or more and 80% by mass or less and optionally containing inorganic salts, inorganic fine particles, organic fine particles, surfactant and preservative, followed by heating the solution or dispersion under the condition at preferably 50° C. or higher and 230° C. or lower for 4 hours or more and 2500 hours or less.

The medium for the solution or the dispersion for the heat treatment is preferably water, ethanol, isopropanol, methyl ethyl ketone, ethyl acetate, toluene, cyclohexane or N,N-dimethylformamide or the like.

(B3) Modified Cellulose Fibers Produced by Introducing an Anionic Group into Raw Material Cellulose Fibers and Further Introducing a Modifying Group Thereinto Modified cellulose fibers are produced by introducing (bonding) a modifying group into the anionic group of anion-modified cellulose fibers. The bonding mode between the anionic group and the modifying group in the modified cellulose fibers is, from the viewpoint of improving dispersion stability, preferably attained by bonding a modifying group-having compound to the anionic group existing in the anion-modified cellulose fibers, by ionic bond and/or covalent bond therebetween.

The modifying group-having compound includes an amine compound and a phosphonium compound, and the like, and into these compounds, for example, a linear or cyclic saturated or unsaturated hydrocarbon group, an aromatic hydrocarbon group, or a copolymerizable site can be introduced as a modifying group. The modifying group-having compound can be appropriately selected depending on the bonding mode to the anionic group.

The modifying group includes a polyamine, an amine having a reactive functional group and an amine not having a reactive functional group to be mentioned hereinunder.
<Polyamine>

The polyamine for use in the present invention is not specifically limited, so far as it is a compound having two or more amino groups in the molecule, but from the viewpoint of availability, from the viewpoint of improving dispersion stability, viscosity increase performance and transparency, and from the viewpoint of obtaining a molded article excellent in mechanical strength, preferred is at least one selected from a diamine and a triamine. The polyamine may optionally have a reactive functional group to be mentioned hereinunder inside the structure thereof. The polyamine is, from the viewpoint of improving dispersion stability, viscosity increase performance and transparency and from the viewpoint of obtaining a molded article excellent in mechanical strength, those having a polysiloxane structure are preferably excluded.

The weight-average molecular weight of the polyamine is, from the viewpoint of improving dispersion stability, viscosity increase performance and transparency, preferably 60 or more, more preferably 80 or more, even more preferably 100 or more, further more preferably 200 or more, further more preferably 300 or more, and is, from the viewpoint of improving transparency, preferably 10000 or less, more preferably 6000 or less, even more preferably 4000 or less, further more preferably 3000 or less.

Plural polyamines can be used here.

The weight-average molecular weight of the polyamine can be measured according to the GPC method described in <Condition 1> in the paragraph [0117] in WO2016/104803. Catalogue values of products can be referred to.

Specific examples of the polyamine include aliphatic diamines, aliphatic triamines, monocyclic aromatic diamines, condensed polycyclic aromatic diamines, bis(diaminophenyl), 4,4'-diaminobiphenyl, bis(aminophenoxy), bis(3-amino-4-hydroxyphenyl), bis(aminobenzoyl), heterocyclic ring-containing diamines, aromatic triamines, aromatic tetramines, alicyclic diamines, polymerization site or copolymerization site-having diamines or triamines, amine-epoxy adduct compounds (reaction products of amine compound and epoxy compound), amine-isocyanate adduct compounds (reaction products of amine compound and isocyanate compound), and derivatives thereof.

Among these, primary amines are preferred, one or more selected from aliphatic primary diamines and aliphatic primary triamines are more preferred and aliphatic primary diamines are even more preferred.

Polyamines having an oxyalkanediyl group as a polymerization site or a copolymerization site are more preferred as improving dispersion stability, viscosity increase performance and transparency.

Here, the average addition molar number of the oxyalkanediyl group is 1 or more, and is preferably 2 or more and 90 or less, more preferably 2 or more and 70 or less, even more preferably 3 or more and 50 or less. The plural oxyalkanediyl groups may be the same as or different from each other.

The oxyalkanediyl group preferably includes at least one selected from an oxypropylene group and an oxyethylene group, more preferably an oxypropylene group.

Among these, preferred are one or more selected from oxyalkanediyl group-having aliphatic primary diamines and aliphatic primary triamines, and more preferred are polyoxyalkanediyl group-having aliphatic primary diamines.

The oxyalkanediyl group-having aliphatic primary diamines are preferably compounds represented by the following formula (1) or (2).

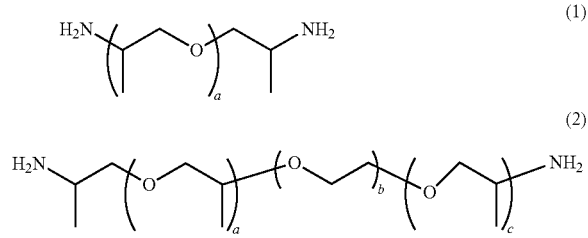

In the formula (1) or (2), a and c each indicates an average addition molar number of propylene oxide (PO), and b indicates an average addition molar number of ethylene oxide (EO).

The average addition molar number of PO, a and c, each are, from the viewpoint of improving dispersion stability, viscosity increase performance and transparency, preferably independently 1 or more, more preferably 2 or more, even more preferably 3 or more, further more preferably 5 or more, and are independently preferably 70 or less, more preferably 60 or less, even more preferably 50 or less, further more preferably 40 or less.

The average addition molar number of EO, b is, from the viewpoint of improving dispersion stability, viscosity increase performance and transparency, preferably 1 or more, more preferably 2 or more, even more preferably 3 or more, further more preferably 5 or more, and is preferably 50 or less, more preferably 40 or less, even more preferably 30 or less, further more preferably 20 or less.

The polyoxyalkanediyl group-having polyamine mentioned above includes polyoxyalkylenediamines, polyoxyalkylenetriamines and the like. Examples of commercial products thereof include Jeffamine series products by U.S. Huntsman Corporation. More specifically, preferred examples thereof include polyoxypropylene(PO)diamines such as Jeffamine D-230, D-400, D-600, D-2000 and D-4000, (PO/EO) copolymer diamines such as Jeffamine ED-600, ED-900 and ED-2003, polyoxyethylenediamines such as Jeffamine EDR-148 and EDR-176, and (PO) copolymer triamines such as Jeffamine T-403, T-3000 and T-5000.

The (PO/EO) copolymerization site in the copolymer diamines and triamines can be a random copolymerization or a block copolymerization.

One alone or two or more kinds of the polyamines can be used either singly or as combined.

<Monoamine Having Reactive Functional Group>

The monoamine having a reactive functional group is, from the viewpoint of improving dispersion stability, viscosity increase performance and transparency, and from the viewpoint of obtaining a molded article excellent in mechanical strength, one having a reactive functional group capable of reacting with a medium such as a resin. The amine having a reactive functional group preferably excludes those having a polysiloxane structure, from the viewpoint of improving dispersion stability, viscosity increase performance and transparency, and from the viewpoint of obtaining a molded article excellent in mechanical strength.

The weight-average molecular weight of the monoamine is, from the same viewpoint as above, preferably 60 or more, more preferably 70 or more, even more preferably 80 or more, further more preferably 90 or more, and is preferably 2000 or less, more preferably 1000 or less, even more preferably 500 or less.

Plural monoamines having a reactive functional group can be used here. The weight-average molecular weight of the monoamine having a reactive functional group can be measured according to the GPC method described in <Condition 1> in the paragraph [0117] in WO2016/104803. Catalogue values of products can be referred to.

Not specifically limited, the reactive functional group may be any reactive functional group except an amino group bonding to cellulose.

Specific examples of the reactive functional group include an epoxy group, a carboxy group, a hydroxy group, a thiol group, a vinyl group, an allyl group, an alkenyl group, an acryloyl group, a methacryloyl group, an aldehyde group, an isocyanate group, a hydrazide group, an oxazoline group, a carbodiimide group, an azetidinium group, a pyridinium group, an imidazolium group, an alkoxide group, a methylol group, and a silanol group. Among these, at least one selected from an epoxy group, a carboxy group, a hydroxy group, a thiol group, an allyl group, an alkenyl group and an acryloyl group is preferred, and at least one selected from an allyl group and an acryloyl group is more preferred.

The monoamine having a reactive functional group for use in the present invention includes primary monoamines, secondary monoamines, tertiary monoamines and quaternary ammoniums having the above-mentioned reactive functional group, and the carbon number thereof is preferably 2 or more, more preferably 6 or more, and is preferably 30 or less, more preferably 24 or less, even more preferably 18 or less.

The primary monoamines include aliphatic monoamines, aromatic monoamines, heterocyclic ring-containing monoamines, alicyclic monoamines, and derivatives such as polyoxyethyleneamines, polyoxypropyleneamines, polyoxyethylene/propylene amines, having the above-mentioned reactive functional group.

Among these, from the viewpoint of reactivity and from the viewpoint of improving dispersion stability, viscosity increase performance and transparency, preferred are primary, secondary or tertiary monoamines having the above-mentioned reactive functional group, more preferred are primary amines having the above-mentioned reactive functional group, and even more preferred are aliphatic primary monoamines where the monoamine has at least one selected from a hydrocarbon group and a polyether group.

Specific examples of the aliphatic monoamines having a reactive functional group include, vinylamine, (mono, di or tri)allylamine, (mono, di or tri)oleylamine, amino group-having acrylates or methacrylates such as 2-(dimethylamino)ethyl acrylate, 2-(diethylamino)ethyl acrylate, 3-(dimethylamino)propyl acrylate, 2-(dimethylamino)ethyl methacrylate, 2-(diethylamino)ethyl methacrylate and 3-(dimethylamino)propyl methacrylate, (mono, di or tri)ethanolamine, heptaminol, isoetarine, (mono, di or tri)propanolamine, sphingosine, (mono, di or tri)methanolamine, dimethylethanolamine, N-methylethanolamine, aromatic amine-type epoxy resin monomers, aminophenol-type epoxy resin monomers and various amino acids having the above-mentioned reactive functional group, and from the viewpoint of reactivity, preferred are (mono, di or tri)

allylamine, amino group-having acrylates or methacrylates such as 2-(dimethylamino)ethylacrylate, and (mono, di or tri)ethanolamine.

Specific examples of aromatic monoamines having a reactive functional group include aminophenol and aminobenzenethiol, and specific examples of hetero ring-containing monoamines having a reactive functional group include N,N-dimethyl-4-aminopyridine and 2-aminopyridine.

<Monoamine not Having a Reactive Functional Group>

In the present invention, from the viewpoint of improving dispersion stability, viscosity increase performance and transparency, preferably used is a cellulose fiber composite in which, as an amine, a monoamine not having a reactive functional group further bonds to anion-modified cellulose fibers.

Preferably, the monoamine not having a reactive functional group has at least one selected from a hydrocarbon group and a polyether group.

Specific examples of the monoamine not having a reactive functional group include propylamine, dipropylamine, butylamine, dibutylamine, hexylamine, 2-ethylhexylamine, dihexylamine, trihexylamine, octylamine, dioctylamine, trioctylamine, dodecylamine, didodecylamine, stearylamine, distearylamine, aniline, benzylamine, dibenzylamine, tribenzylamine, naphthylamine, tritylamine, octadecylamine, dimethylbenzylamine, tetraethylammonium, tetrapropylammonium, and tetrabutylammonium.

In the case where the monoamine not having a reactive functional group has an oxyalkanediyl group, the monoamine of the type is more preferred as improving dispersion stability, viscosity increase performance and transparency, and the oxyalkanediyl group preferably contains at least one selected from an oxypropylene group and an oxyethylene group, more preferably an oxypropylene group.

Here, the average addition molar number of the oxyalkanediyl group is 1 or more, and is preferably 2 or more and 100 or less, more preferably 2 or more and 70 or less, even more preferably 3 or more and 50 or less. Plural alkanediyl groups may be the same as or different from each other.

As specific examples of the monoamine not having a reactive functional group, preferred are compounds represented by the following formula (3).

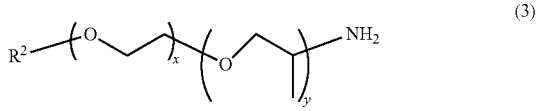

(3)

In the formula (3), $R^2$ represents a hydrogen atom, or a linear or branched alkyl group having 1 to 6 carbon atoms, x represents an average addition molar number of ethylene oxide (EO), and y represents an average addition molar number of propylene oxide (PO).

The average addition molar number x of EO is, from the viewpoint of improving dispersion stability, viscosity increase performance and transparency, preferably 1 or more, more preferably 2 or more, even more preferably 3 or more, further more preferably 5 or more, and is preferably 100 or less, more preferably 70 or less, even more preferably 50 or less.

The average addition molar number y of PO is, from the viewpoint of improving dispersion stability, viscosity increase performance and transparency, preferably 1 or more, more preferably 2 or more, even more preferably 3 or more, further more preferably 5 or more, and is preferably 50 or less, more preferably 40 or less, even more preferably 30 or less.

The ratio of average addition molar number (y/x) is, from the viewpoint of improving dispersion stability, viscosity increase performance and transparency, preferably 0.1 or more, more preferably 0.2 or more, even more preferably 0.3 or more, further more preferably 1 or more, and is preferably 20 or less, more preferably 15 or less, even more preferably 10 or less.

Examples of commercial products of the monoamine not having a reactive functional group mentioned above include Jeffamine M-600, M-1000, M-2005 and M-2070 by U.S. Huntsman Corporation.

One alone or two or more kinds of the above-mentioned monoamines not having a reactive functional group can be used either singly or as combined.

In the present invention, at least one amine selected from polyamines and monoamines having a reactive functional group (total amine) can be controlled by the amine introduction ratio represented by the following formula (1).

Amine introduction ratio (%)=[amount of amine bonding to the anionic group introduced into the cellulose fibers (mmol/g)/content of the anionic group introduced into the cellulose fibers (mmol/g)]×100     (1)

In the above formula (1), "amount of amine bonding to the anionic group introduced into the cellulose fibers" is, more specifically, "amount of at least one amine selected from the polyamine and the monoamine having a reactive functional group bonding to the anionic group introduced into the cellulose fibers (mmol/g)".

The "amount of amine" means an average bonding amount of amine (mmol/g), and the "content of the anionic group introduced into the cellulose fibers" means, in the case where the anionic group is a carboxy group, the content of the carboxy group in the cellulose fibers before amine introduction thereinto (mmol/g).

Here, in the case where plural kinds of amines selected from polyamines and monoamines having a reactive functional group are introduced, the introduction ratio of amines selected from polyamines and monoamines having a reactive functional group is a total of the introduction ratio of each amine.

It is considered that amines are introduced mainly into the surfaces of cellulose fibers.

In the first aspect of the invention, the introduction ratio of the amine represented by the formula (1) is, from the viewpoint of improving dispersion stability and improving viscosity increase performance, 60% or less, preferably 55% or less, more preferably 50% or less, even more preferably 45% or less, further more preferably 40% or less, and is, from the viewpoint of obtaining a molded article excellent in mechanical strength, preferably 5% or more, more preferably 10% or more, even more preferably 15% or more. From the above viewpoint, the introduction ratio of the amine represented by the formula (1) is preferably 5% or more and 60% or less, more preferably 5% or more and 55% or less, even more preferably 10% or more and 50% or less, further more preferably 10% or more and 45% or less.

Also in the first aspect of the invention, regarding the total amine of the polyamine, the monoamine having a reactive functional group and the monoamine not having a reactive functional group, the amine introduction ratio represented by the following formula (2) is, from the viewpoint of improving dispersion stability and viscosity increase performance, preferably 40% or more and 100% or less, more preferably 70% or more and 100% or less, even more preferably 90% or more and 100% or less.

Amine introduction ratio (%)=[average bonding amount of amine (mmol/g)/carboxy group content in cellulose fibers before amine introduction (mmol/g)]×100      (2)

In the above formula (2), "average bonding amount of amine (mmol/g)" means, more specifically, "average bonding amount of total amine of one or more selected from polyamine, monoamine having a reactive functional group and monoamine not having a reactive functional group bonding to the anionic group introduced into cellulose fibers (mmol/g)".

However, in the case where the average polymerization degree of the anion-modified cellulose fibers is 300 or less, the amine introduction ratio is, from the viewpoint of improving dispersion stability and improving viscosity increase performance and transparency, 100% or less, preferably 80% or less, more preferably 60% or less, and is, from the viewpoint of improving viscosity increase performance and transparency, preferably 55% or less, more preferably 50% or less, even more preferably 45% or less, further more preferably 40% or less, and is, from the viewpoint of obtaining a molded article excellent in mechanical strength, preferably 5% or more, more preferably 10% or more, even more preferably 15% or more.

In the second aspect of the invention, the amine introduction ratio represented by the above formula (1) is, from the viewpoint of improving dispersion stability and transparency, preferably 10% or more and 100% or less, but is, from the viewpoint of improving viscosity increase performance, preferably 60% or less, more preferably 55% or less, even more preferably 50% or less, further more preferably 45% or less, further more preferably 40% or less, and is, from the viewpoint of obtaining a molded article excellent in mechanical strength, preferably 5% or more, more preferably 10% or more, even more preferably 15% or more.

Also in the second aspect of the invention, regarding the total amine of the polyamine, the monoamine having a reactive functional group and the monoamine not having a reactive functional group, the amine introduction ratio represented by the above-mentioned formula (2) is, from the viewpoint of improving dispersion stability and transparency, preferably 40% or more and 100% or less, more preferably 70% or more and 100% or less, even more preferably 90% or more and 100% or less.

In the present invention, the introduction ratio of the monoamine not having a reactive functional group represented by the following formula (3) is, from the viewpoint of improving viscosity increase performance and transparency, preferably 5% or more, more preferably 10% or more, even more preferably 20% or more, further more preferably 30% or more, and is, from the viewpoint of obtaining a molded article excellent in mechanical strength, preferably 95% or less, more preferably 90% or less, even more preferably 70% or less, further more preferably 50% or less. From the above viewpoint, the introduction ratio of the monoamine not having a reactive functional group represented by the following formula (3) is preferably 5% or more and 95% or less, more preferably 10% or more and 90% or less, even more preferably 10% or more and 70% or less.

Introduction ratio of monoamine not having a reactive functional group (%)=[amount of monoamine not having a reactive functional group bonding to the anionic group introduced into cellulose fibers (mmol/g)/content of the anionic group introduced into cellulose fibers (mmol/g)×100      (3)

Here, in the case where plural kinds of monoamines not having a reactive functional groups are introduced, the introduction ratio of monoamine not having a reactive functional group is a total of the introduction ratio of each amine.

A proportion of the introduction ratio of monoamine not having a reactive functional group to the total introduction ratio of polyamine and monoamine having a reactive functional group (introduction ratio of monoamine not having a reactive functional group/total introduction ratio of polyamine and monoamine having a reactive functional group) is, from the viewpoint of improving viscosity increase performance and transparency, preferably 0.01 or more, more preferably 0.05 or more, even more preferably 0.1 or more, further more preferably 0.15 or more, and is, from the viewpoint of improving the mechanical strength of molded articles, preferably 10 or less, more preferably 5 or less, even more preferably 3 or less, further more preferably 1 or less. From the above viewpoint, the proportion of the monoamine introduction ratio (introduction ratio of monoamine not having a reactive functional group/total introduction ratio of polyamine and monoamine having a reactive functional group) is preferably 0.01 or more and 10 or less, more preferably 0.05 or more and 5 or less, even more preferably 0.1 or more and 3 or less, further more preferably 0.15 or more and 1 or less.

The amine introduction ratio can be calculated from the data of the amine bonding amount in the cellulose fiber composite measured in infrared absorption spectroscopy (IR). Specifically, it can be performed according to the method described in the section of Examples.

<Production of Cellulose Fiber Composite>

In the cellulose fiber composite of the first aspect of the invention, at least one amine selected from a polyamine and a monoamine having a reactive functional group bonds to anion-modified cellulose fibers. The bonding may be in any mode of covalent bonding or ionic bonding, but is, from the viewpoint of easiness in production, preferably an ionic bonding between the anionic group of anion-modified cellulose fibers and the amine.

In the cellulose fiber composite of the first aspect of the invention, the ratio by mass of one or more amines selected from the polyamine (B-1) and the monoamine having a reactive functional group (B-2) [total amine (B)=(B-1)+(B-2)] to the anion-modified cellulose fibers (A) [(B)/(A)] is, from the viewpoint of expressing affinity of the reactive functional group to a medium to thereby improve dispersion stability, viscosity increase performance and transparency, preferably 0.02 or more, more preferably 0.05 or more, even more preferably 0.1 or more, further more preferably 0.2 or more, and is preferably 30 or less, more preferably 20 or less, even more preferably 10 or less, further more preferably 8 or less, further more preferably 5 or less, further more preferably 3 or less, further more preferably 1 or less.

In the cellulose fiber composite of the second aspect of the invention, at least one amine selected from a polyamine and a monoamine having a reactive functional group bonds to anion-modified cellulose fibers having an average polymerization degree of 300 or less. The bonding may be in any mode of covalent bonding or ionic bonding, but is, from the viewpoint of easiness in production, preferably an ionic bonding between the anionic group of the anion-modified cellulose fibers and the amine.

In the cellulose fiber composite of the second aspect of the invention, the ratio by mass [(B)/(A)] is, from the viewpoint of improving dispersion stability and transparency, preferably 0.02 or more, more preferably 0.1 or more, even more preferably 0.3 or more, further more preferably 0.5 or more, and is preferably 30 or less, more preferably 20 or less, even more preferably 10 or less, further more preferably 8 or less, further more preferably 5 or less.

In the case where a monoamine not having a reactive functional group (C) is used, the ratio by mass of the monoamine not having a reactive functional group (C) to the anion-modified cellulose fibers (A) in the cellulose fiber composite [(C)/(A)] is, from the viewpoint of improving dispersion stability, viscosity increase performance and transparency, preferably 0.05 or more, more preferably 0.1 or more, even more preferably 0.5 or more, and is preferably 10 or less, more preferably 5 or less, even more preferably 3 or less.

The cellulose fiber composite can be produced by mixing anion-modified cellulose fibers and at least one amine selected from a polyamine and a monoamine having a reactive functional group. From the viewpoint of ion-bonding the anionic group and the amine, the anion-modified cellulose fibers are preferably acid-type ones.

Specifically, the mixture is obtained, for example, by dispersing the components in an aqueous medium with a stirrer. The aqueous medium is preferably a liquid medium containing water in an amount of at least 10% by mass or more.

Production of the cellulose fiber composite can be performed, for example, by dispersing the components in a non-aqueous medium such as ethyl acetate containing at most 10% by mass or less of water, with a stirrer.

The content of the aqueous medium in the water-based composition in production of the cellulose fiber composite is, though not specifically limited thereto, preferably 30% by mass or more, more preferably 50% by mass or more, even more preferably 60% by mass or more, further more preferably 70% by mass or more.

In production of the cellulose fiber composite, known additives such as a dispersant, a viscosity regulator, a water-soluble polymer and an antioxidant can be contained, as needed.

The cellulose fiber composite of the present invention is excellent in dispersion stability, viscosity increase performance and transparency, and is therefore favorably used for various industrial products such as everyday goods, household electrical appliance parts, packing materials for household electrical appliance parts, and automobile parts.

[Method for Producing Fine Cellulose Fiber Composite]

The cellulose fiber composite of the present invention can be, after anion-modified cellulose fibers are mixed with at least one amine selected from a polyamine and a monoamine having a reactive functional group, optionally further disintegrated to be a fine cellulose fiber composite.

Disintegration treatment is a mechanical treatment, and by disintegration, the cellulose fiber composite can be converted into a fine cellulose fiber (nanofiber) having a nanoscale fiber length and fiber diameter.

By defibration of cellulose fibers into nanofibers, a cellulose nanofiber dispersion having a high transparency can be produced.

By further disintegrating the shortened anion-modified cellulose fibers to give previously fine cellulose fibers, followed by adding a polyamine thereto, a fine cellulose fiber composite can also be produced.

The apparatus for use in disintegrating the cellulose fibers is not specifically limited. Examples thereof include, a disintegrator, a beater, a low-pressure homogenizer, a high-pressure homogenizer, a grinder, a cutter mill, a ball mill, a jet mill, a single-screw extruder, a twin-screw extruder, and an ultrasonic stirrer. In disintegration, preferably, a strong shearing force is applied to a dispersion of cellulose fibers. From the viewpoint of disintegration efficiency, preferred is use of a wet-type high-pressure homogenizer capable of imparting a strong shearing force.

A high-pressure homogenizer is an apparatus in which a fluid is pressurized (to high pressure) and jetted out through an extremely fine orifice provided in a channel, and accordingly, dispersion, defibration, grinding or disintegration is performed by the total energy such as a shearing force caused by collision between particles or a pressure difference.

The pressure to be applied to the dispersion using a high-pressure homogenizer is, from the viewpoint of disintegration efficiency, preferably 50 MPa or more, more preferably 100 MPa or more, even more preferably 120 MPa or more. The number of processing passes is, from the viewpoint of disintegration efficiency, preferably 1 or more, preferably 2 or more, and is preferably 20 or less, more preferably 15 or less, even more preferably 10 or less.

In the case of the first aspect of the invention, the average fiber length of the cellulose fiber composite or the fine cellulose fiber composite obtained after the above-mentioned disintegration treatment is, from the viewpoint of obtaining a molded article excellent in mechanical strength, preferably 20 nm or more, more preferably 40 nm or more, even more preferably 60 nm or more, further more preferably 100 nm or more, and is, from the viewpoint of improving dispersion stability and viscosity increase performance, preferably 900 nm or less, more preferably 700 nm or less, even more preferably 600 nm or less, further more preferably 500 nm or less, further more preferably 200 nm or less.

The average fiber diameter of the cellulose fiber composite or the fine cellulose fiber composite is, from the viewpoint of obtaining a molded article excellent in mechanical strength, preferably 1 nm or more, more preferably 2 nm or more, even more preferably 2.5 nm or more, and is, from the viewpoint of improving dispersion stability and viscosity increase performance, preferably 60 nm or less, more preferably 40 nm or less, even more preferably 20 nm or less.

The average aspect ratio (average fiber length/average fiber diameter) of the cellulose fiber composite or the fine cellulose fiber composite is, from the viewpoint of obtaining a molded article excellent in mechanical strength, preferably 5 or more, more preferably 10 or more, even more preferably 20 or more, and is, from the viewpoint of improving dispersion stability and viscosity increase performance, preferably 300 or less, more preferably 250 or less, even more preferably 200 or less, further more preferably 180 or less, further more preferably 100 or less, further more preferably 50 or less.

In the case of the second aspect of the invention, the average fiber length of the cellulose fiber composite or the fine cellulose fiber composite obtained after the above-mentioned disintegration treatment is, from the viewpoint of obtaining a molded article excellent in mechanical strength, preferably 20 nm or more, more preferably 40 nm or more, even more preferably 60 nm or more, further more preferably 100 nm or more, and is, from the viewpoint of improving dispersion stability and transparency, preferably 900 nm or less, more preferably 800 nm or less, even more preferably 700 nm or less, further more preferably 600 nm or less, further more preferably 500 nm or less, further more preferably 200 nm or less.

The average fiber diameter of the cellulose fiber composite or the fine cellulose fiber composite is, from the viewpoint of obtaining a molded article excellent in mechanical strength, preferably 1 nm or more, more preferably 2 nm or more, even more preferably 3 nm or more, and is, from the viewpoint of improving dispersion stability and transparency, preferably 60 nm or less, more preferably 40 nm or less, even more preferably 20 nm or less.

The average aspect ratio (average fiber length/average fiber diameter) of the cellulose fiber composite or the fine cellulose fiber composite is, from the viewpoint of obtaining a molded article excellent in mechanical strength, preferably 5 or more, more preferably 10 or more, even more preferably 20 or more, and is, from the viewpoint of improving dispersion stability and transparency, preferably 300 or less, more preferably 250 or less, even more preferably 200 or less, further more preferably 180 or less, further more preferably 100 or less, further more preferably 50 or less.

From the above viewpoints, in the present invention, the average fiber length of the cellulose fiber composite or the fine cellulose fiber composite obtained after the above-mentioned disintegration treatment is preferably 20 nm or more and 900 nm or less, more preferably 40 nm or more and 700 nm or less, even more preferably 60 nm or more and 600 nm or less, the average fiber diameter is preferably 1 nm or more and 60 nm or less, more preferably 1 nm or more and 40 nm or less, even more preferably 2 nm or more and 20 nm or less, and the average aspect ratio (average fiber length/average fiber diameter) is preferably 5 or more and 200 or less, more preferably 10 or more and 180 or less, even more preferably 20 or more and 150 or less.

The average fiber length, the average fiber diameter and the average aspect ratio of the cellulose fiber composite and the fine cellulose fiber composite can be measured according to the methods described in the section of Examples, using an atomic force microscope (AFM).

<Dispersion>

The dispersion of the present invention contains the cellulose fiber composite of the present invention dispersed in a medium.

The cellulose fiber composite of the present invention can be dispersed in a medium to give a dispersion containing the cellulose fiber composite excellent in dispersion stability.

The dispersion is excellent in handleability, and is therefore favorably used in various industrial uses for everyday goods, household electrical appliance parts, packing materials for household electrical appliance parts, and automobile parts.

(Medium)

The medium is not specifically limited and includes, depending on use, water; alcohol solvents such as ethanol and isopropanol; ketone solvents such as acetone and methyl ethyl ketone; ester solvents such as ethyl acetate, methyl methacrylate and a diester of succinic acid and triethylene glycol monomethyl ether; amide solvents such as dimethylformamide, N,N-dimethylformamide and N,N-dimethylacetamide; hydrocarbon solvents such as toluene; organic solvents such as acetic acid, acetonitrile, dichloromethane, chloroform, dimethyl sulfoxide and tetrahydrofuran; and monomers, prepolymers and polymers. These may be used either singly or as combined. Among these, from the viewpoint of dispersion stability and viscosity increase performance, preferred is one or more selected from water, alcohol solvents, ketone solvents and amide solvents.

The amount of the cellulose fiber composite to be blended in the dispersion is preferably 0.1% by mass or more, more preferably 0.3% by mass or more, even more preferably 0.5% by mass or more, and is preferably 90% by mass or less, more preferably 80% by mass or less, even more preferably 70% by mass or less, further more preferably 65% by mass or less.

(Production of Dispersion)

The dispersion of the present invention can be obtained by mechanically processing the cellulose fiber composite of the present invention and the above-mentioned medium, using a mixing impeller-equipped stirrer, a disintegrator, a beater, a low-pressure homogenizer, a high-pressure homogenizer, a grinder, a cutter mill, a ball mill, a jet mill, a roll mill, a single-screw kneader, a twin-screw kneader, a single-screw extruder, a twin-screw extruder, an ultrasonic stirrer, or the like. At that time, in consideration of the use of the medium, the dispersion treatment condition such as temperature or pressure can be appropriately controlled, as needed.

[Resin Composition]

The resin composition of the present invention is produced by blending the cellulose fiber composite of the present invention and a resin.

The resin to be contained in the resin composition for use in the present invention is not specifically limited, and examples thereof include a thermoplastic resin, a curable resin, a cellulosic resin, and a rubber resin. A resin precursor can also be blended. Such resins or resin precursors can be used either singly or as combined.

(Thermoplastic Resin)

The thermoplastic resin includes saturated polyester resins such as polylactic acid resins; olefin resins such as polyethylene resins, and polypropylene resins; vinyl resins such as vinyl chloride resins, vinylidene chloride resins, styrene resins, vinyl ether resins, polyvinyl alcohol resins, polyvinyl acetal resins, and polyvinyl acetate resins; (meth)acrylic resins; polyamide resins; polycarbonate resins; polysulfone resins; polyurethane resins; and phenoxy resins. Among these, as giving a dispersion excellent in dispersibility, preferred are olefin resins, polycarbonate resins, (meth)acrylic resins, vinyl chloride resins and polyurethane resins, more preferred are (meth)acrylic resins, and even more preferred are (meth)acrylic resins containing 50% by weight or more of methyl (meth)acrylate as a monomer unit. (Meth)acrylic resin means methacrylic resin and/or acrylic resin.

(Curable Resin)

The curable resin includes a photocurable resin and/or a thermosetting resin.

The photocurable resin undergoes polymerization reaction using a photopolymerization initiator that generates a radical or a cation by active energy ray irradiation with UV rays or electron beams. The photocurable resin is preferred as giving a dispersion or a molded article excellent in transparency with few aggregates.

Examples of the photopolymerization initiator include the compounds described in paragraph [0113] of JP2018-024967A.

Using the photopolymerization initiator, for example, monomers (monofunctional monomers, polyfunctional monomers), reactive unsaturated group-having oligomers or resins can be polymerized.

The monomers include monofunctional monomers, e.g., (meth)acrylic monomers such as (meth)acrylates, acryloyl monomers such as acryloyl morpholine, vinyl monomers such as vinyl pyrrolidone, crosslinked cyclic hydrocarbon group-having (meth)acrylates such as isobornyl (meth)acrylate, and adamantyl (meth)acrylate, di(meth)acrylate-type difunctional monomers such as ethylene glycol di(meth)acrylate, propylene glycol di(meth)acrylate, and hexanediol diacrylate, and tri- to octa-functional monomers such as dipentaerythritol hexaacrylate, and glycerin tri(meth)acrylate.

The reactive unsaturated group-having oligomers or resins include (meth)acrylates such as bisphenol A-alkylene oxide adducts, epoxy(meth)acrylates (e.g., bisphenol A epoxy (meth)acrylates, novolak epoxy (meth)acrylates), polyester (meth)acrylates (e.g., aliphatic polyester (meth) acrylates, aromatic polyester (meth)acrylates), urethane (meth)acrylates (e.g., polyester urethane (meth)acrylates, polyether urethane (meth)acrylates), and silicone (meth) acrylates.

The thermosetting resin includes epoxy resins, phenoxy resins, phenol resins, urea resins, melamine resins, unsaturated polyester resins, diallyl phthalate resins, polyurethane resins, silicon resins and polyimide resins. As giving a dispersion excellent in dispersibility, preferred are epoxy resins, phenoxy resins, phenol resins, urea resins, melamine resins, unsaturated polyester resins, and polyurethane resins, and more preferred are epoxy resins, phenol resins, phenoxy resins and polyurethane resins.

(Cellulosic Resin)

The cellulosic rein includes organic acid esters such as cellulose acetate, and cellulose mixed acylate, e.g., cellulose acetate propionate; inorganic acid esters such as cellulose nitrate, and cellulose phosphate; organic acid inorganic acid mixed acid esters such as cellulose nitrate acetate; and cellulose ether esters such as acetylated hydroxypropyl cellulose. Cellulose acetate includes cellulose triacetate (acetyl substitution degree: 2.6 to 3), cellulose diacetate (acetyl substitution degree: 2 to 2.6), and cellulose monoacetate.

(Rubber Resin)

The cellulose fiber composite of the present invention is excellent in dispersion stability, and therefore, when blended with a rubber resin, it can give a molded article excellent in mechanical strength.

The rubber resin includes a dienic rubber, and a non-dienic rubber.

The dienic rubber includes a natural rubber, a polyisoprene rubber, a polybutadiene rubber, a styrene-butadiene copolymer rubber, a butyl rubber, a butadiene-acrylonitrile copolymer rubber, a chloroprene rubber, and a modified natural rubber such as an epoxydated natural rubber, and a hydrogenated natural rubber. The non-dienic rubber includes a butyl rubber, an ethylene-propylene rubber, an ethylene-propylene-diene rubber, an urethane rubber, a silicone rubber, a fluorine rubber, an acryl rubber, a polysulfide rubber, and an epichlorohydrin rubber.

For the resin composition of the present invention, a resin to be blended can be appropriately selected depending on the structure of the modifying group that the cellulose fiber composite therein has, and the resin composition can secure an improving effect to provide a further higher mechanical strength.

For example, in the case where the modifying group a introduced into the cellulose fiber composite is an amino group, a hydroxy group, a thiol group, a carboxy group or an alkoxide group, preferred are an epoxy resin, an isocyanate-based curable resin (including a case where the resin itself contains a curable isocyanate group, and a case where an isocyanate is used as a curing agent), an ester resin, an urethane resin, a thioester resin, a thiourethane resin, as well as a resin having a carboxylic acid anhydride structure or a carboxylic acid halide structure, a lactone structure or a lactam structure, and other resins having a functional group reactive with the modifying group a in the skeleton.

In the case where the modifying group b introduced into the cellulose fiber composite is a vinyl group, an allyl group, an alkenyl group, an acryloyl group or a methacryloyl group, preferred are a curable resin having radical curability (photocurable resin such as acrylic resin, and sulfur-curable resin such as rubber), and other resins having a functional group reactive with the modifying group b in the skeleton.

In the case where the modifying group c introduced into the cellulose fiber composite is a carboxy group, an epoxy group, an aldehyde group or an isocyanate group, preferred are an epoxy resin, an ester resin, an urethane resin, a thioester resin, a thiourethane resin, and other resins having a functional group reactive with the modifying group c in the skeleton.

In the case where the modifying group introduced into the cellulose fiber composite is an oxazoline group, preferred are resins having a functional group reactive with an oxazoline group in the skeleton, such as a carboxy group, a hydroxy group, a thiol group, and an amino group.

In the case where the modifying group introduced into the cellulose fiber composite contains a silanol group, preferred are resins having a functional group reactive with a silanol group in the skeleton, such as silicone resins. The composition of a cellulose fiber composite and a resin can be produced by mixing the cellulose fiber composite of the present invention and the above-mentioned resin, or can also be produced by mixing with a precursor of the resin such as a monomer or an oligomer, and then polymerizing the mixture to give a resin composition.

The amount of the cellulose fiber composite in the resin composition of the present invention can be appropriately determined depending on the physical properties of the resin and the molding method, but is, from the viewpoint of exhibiting the effect of blending the cellulose fiber composite, preferably 0.1 parts by mass or more, more preferably 0.3 parts by mass or more, even more preferably 0.5 parts by mass or more, further more preferably 1 part by mass or more, in terms of the blending amount and relative to 100 parts by mass of the resin, and is preferably 100 parts by mass or less, more preferably 50 parts by mass or less, even more preferably 30 parts by mass or less, further more preferably 10 parts by mass or less.

(Other Components)

As needed, the resin composition of the present invention can be blended with a plasticizer, a crystal nucleating agent, a filler, a hydrolysis inhibitor, a flame retardant, a lubricant, an antioxidant, a UV absorbent, an antistatic agent, an antifogging agent, a light stabilizer, a pigment, an antifungal agent, an antibacterial agent, a foaming agent, a polysaccharide, a fragrance, and the like.

In the case where the resin composition is blended with a rubber resin, in addition to the above-mentioned components and if desired, other various additives, such as a reinforcing filler, e.g., carbon black and silica, various chemicals, e.g., a vulcanizing agent, a vulcanization accelerator, an antiaging agent, a scorch inhibitor, zinc oxide, stearic acid, process oil and vegetable oils and fats, can be blended therein in an ordinary amount.

(Preparation of Resin Composition)

The resin composition can be prepared by dispersing the cellulose fiber composite, the above-mentioned resin, and optionally a dispersion medium and other components than these, in a high-pressure homogenizer. Also for preparing the resin composition, these raw materials can be stirred in a Henschel mixer or a rotation/revolution type stirrer, or melt-kneaded using a known kneader such as a closed kneader, a single-screw or twin-screw extruder, or an open roll-type kneader.

[Molded Article]

The molded article of the present invention is produced by molding the cellulose fiber composite of the present invention or the resin composition containing the cellulose fiber composite and a resin.

(Molding Method)

For molding, employable is a known molding method of extrusion molding, injection molding, pressing, casting or solvent casting. The cellulose fiber composite and the resin composition of the present invention are excellent in dispersion stability, and therefore the molded articles of various resin products can also be excellent in mechanical strength such as tensile elasticity and tensile strength. This is presumed to be because the cellulose fiber composite excellent in dispersion stability can have a pseudo-crosslinked structure in the resin.

(Use of Molded Article)

The use of the molded article of the present invention is not specifically limited. For example, the molded article can be used for transparent resin materials, three-dimensional modeling materials, cushioning materials, repairing materials, bonding agents, adhesives, sealing materials, heat insulators, acoustic materials, artificial leather materials, paints, electronic materials, wrapping materials, tires, automobile parts, and fiber composite materials. Among them, in particular, since molded articles excellent in transparency can be obtained, they are favorably used for transparent resin materials, bonding agents, adhesives, paints, electronic materials, and fiber composite materials, and since molded articles excellent in mechanical strength can be obtained, they are favorably used for three-dimensional modeling materials, cushioning materials, repairing materials, sealing materials, heat insulators, acoustic materials, tires, automobile parts, and wrapping materials.

With respect to the above-mentioned embodiments, the present invention further discloses the following [1] to [49].

[1] A cellulose fiber composite, in which at least one amine selected from a polyamine and a monoamine having a reactive functional group bonds to anion-modified cellulose fibers, and which satisfies at least one of the following requirements 1 and 2:

Requirement 1: The amine introduction ratio represented by the following formula (1) is 60% or less, Amine introduction ratio (%)=[amount of amine bonding to the anionic group introduced into the cellulose fibers (mmol/g)/content of the anionic group introduced into the cellulose fibers (mmol/g)]×100    (1)

Requirement 2: The average polymerization degree of the anion-modified cellulose fibers is 300 or less.

[2] The cellulose fiber composite according to the above [1], wherein the average polymerization degree of the anion-modified cellulose fibers in the requirement 2 is 30 or more and 300 or less.

[3] The cellulose fiber composite according to the above [1], wherein the average polymerization degree of the anion-modified cellulose fibers in the requirement 2 is 50 or more and 300 or less.

[4] The cellulose fiber composite according to the above [1], wherein the average polymerization degree of the anion-modified cellulose fibers in the requirement 2 is 50 or more and 250 or less.

[5] The cellulose fiber composite according to any of the above [1] to [4], wherein the amine introduction ratio in the requirement 1 is 5% or more and 60% or less.

[6] The cellulose fiber composite according to any of the above [1] to [4], wherein the amine introduction ratio in the requirement 1 is 5% or more and 55% or less.

[7] The cellulose fiber composite according to any of the above [1] to [4], wherein the amine introduction ratio in the requirement 1 is 10% or more and 50% or less.

[8] The cellulose fiber composite according to any of the above [1] to [7], wherein the content of the anionic group in the anion-modified cellulose fibers is 0.1 mmol/g or more and 3 mmol/g or less.

[9] The cellulose fiber composite according to any of the above [1] to [7], wherein the content of the anionic group in the anion-modified cellulose fibers is 0.2 mmol/g or more and 2 mmol/g or less.

[10] The cellulose fiber composite according to any of the above [1] to [9], wherein the average aspect ratio of the anion-modified cellulose fibers is 2 or more and 200 or less.

[11] The cellulose fiber composite according to any of the above [1] to [9], wherein the average aspect ratio of the anion-modified cellulose fibers is 3 or more and 100 or less.

[12] The cellulose fiber composite according to any of the above [1] to [11], wherein the polyamine is at least one selected from diamines and triamines.

[13] The cellulose fiber composite according to any of the above [1] to [12], wherein the polyamine is at least one selected from aliphatic diamines, aliphatic triamines, monocyclic aromatic diamines, condensed polycyclic aromatic diamines, bis(diaminophenyl), 4,4'-diaminobiphenyl, bis(aminophenoxy), bis(3-amino-4-hydroxyphenyl), bis(aminobenzoyl), heterocyclic ring-containing diamines, aromatic triamines, aromatic tetramines, alicyclic diamines, polymerization site or copolymerization site-having diamines or triamines, amine-epoxy adduct compounds (reaction products of amine compound and epoxy compound), amine-isocyanate adduct compounds (reaction products of amine compound and isocyanate compound), and derivatives thereof.

[14] The cellulose fiber composite according to any of the above [1] to [13], wherein the polyamine has an oxyalkanediyl group.

[15] The cellulose fiber composite according to the above [14], wherein the average addition molar number of the oxyalkanediyll group is 2 or more and 90 or less.

[16] The cellulose fiber composite according to the above [14], wherein the average addition molar number of the oxyalkanediyll group is 2 or more and 70 or less.

[17] The cellulose fiber composite according to the above [14], wherein the average addition molar number of the oxyalkanediyll group is 3 or more and 50 or less.

[18] The cellulose fiber composite according to any of the above [14] to [17], wherein the oxyalkanediyl group contains at least one selected from an oxypropylene group and an oxyethylene group.

[19] The cellulose fiber composite according to any of the above [14] to [18], wherein the oxyalkanediyl group contains an oxypropylene group.

[20] The cellulose fiber composite according to any of the above [1] to [19], wherein the polyamine is at least one selected from aliphatic primary diamines and aliphatic primary triamines.

[21] The cellulose fiber composite according to any of the above [1] to [20], wherein the polyamine is at least one selected from aliphatic primary diamines and aliphatic primary triamines having an oxyalkanediyl group.

[22] The cellulose fiber composite according to any of the above [1] to [21], wherein the reactive functional group is at least one selected from an epoxy group, a carboxy group, a hydroxy group, a thiol group, a vinyl group, an allyl group, an alkenyl group, an acryloyl group, a methacryloyl group, an aldehyde group, an isocyanate group, a hydrazide group, an oxazoline group, a carbodiimide group, an azetidinium group, a pyridinium group, an imidazolium group, an alkoxide group, a methylol group, and a silanol group.

[23] The cellulose fiber composite according to any of the above [1] to [21], wherein the reactive functional group is at least one selected from an epoxy group, a carboxy group, a hydroxy group, a thiol group, an allyl group, an alkenyl group and an acryloyl group.

[24] The cellulose fiber composite according to any of the above [1] to [23], wherein a monoamine not having a reactive functional group further bonds to the anion-modified cellulose fibers.

[25] The cellulose fiber composite according to the above [24], wherein the monoamine not having a reactive functional group is at least one selected from a a hydrocarbon group and a polyether group.

[26] The cellulose fiber composite according to the above [24] or [25], wherein the monoamine not having a reactive functional group has an oxyalkanediyl group.

[27] The cellulose fiber composite according to the above [26], wherein the oxyalkanediyl group contains at least one selected from an oxypropylene group and an oxyethylene group.

[28] The cellulose fiber composite according to the above [27], wherein the oxyalkanediyl group contains an oxypropylene group.

[29] The cellulose fiber composite according to any of the above [26] to [28], wherein the average addition molar number of the oxyalkanediyl group is 2 or more and 100 or less.

[30] The cellulose fiber composite according to any of the above [26] to [28], wherein the average addition molar number of the oxyalkanediyl group is 2 or more and 70 or less.

[31] The cellulose fiber composite according to any of the above [24] to [30], wherein the introduction ratio of monoamine not having a reactive functional group is 5% or more and 95% or less.

[32] The cellulose fiber composite according to any of the above [24] to [30], wherein the introduction ratio of monoamine not having a reactive functional group is 10% or more and 90% or less.

[33] The cellulose fiber composite according to any of the above [1] to [32], wherein the proportion of the introduction ratio of monoamine not having a reactive functional group to the total introduction ratio of polyamine and monoamine having a reactive functional group (introduction ratio of monoamine not having a reactive functional group/total introduction ratio of polyamine and monoamine having a reactive functional group) is 0.01 or more and 10 or less.

[34] The cellulose fiber composite according to any of the above [1] to [32], wherein the proportion of the introduction ratio of monoamine not having a reactive functional group to the total introduction ratio of polyamine and monoamine having a reactive functional group (introduction ratio of monoamine not having a reactive functional group/total introduction ratio of polyamine and monoamine having a reactive functional group) is 0.05 or more and 5 or less.

[35] The cellulose fiber composite according to any of the above [1] to [32], wherein the proportion of the introduction ratio of monoamine not having a reactive functional group to the total introduction ratio of polyamine and monoamine having a reactive functional group (introduction ratio of monoamine not having a reactive functional group/total introduction ratio of polyamine and monoamine having a reactive functional group) is 0.1 or more and 3 or less.

[36] The cellulose fiber composite according to any of the above [1] to [35], wherein the average fiber length of the anion-modified cellulose fibers is 2500 μm or less.

[37] The cellulose fiber composite according to any of the above [1] to [36], wherein the anionic group of the anion-modified cellulose fibers is a carboxy group.

[38] The cellulose fiber composite according to any of the above [1] to [37], wherein the anionic group of the anion-modified cellulose fibers bonds to the amine by ionic bonding.

[39] The cellulose fiber composite according to any of the above [1] to [38], wherein the average aspect ratio (average fiber length/average fiber diameter) of the cellulose fiber composite is 5 or more and 200 or less.

[40] The cellulose fiber composite according to any of the above [1] to [38], wherein the average aspect ratio (average fiber length/average fiber diameter) of the cellulose fiber composite is 10 or more and 180 or less.

[41] The cellulose fiber composite according to any of the above [1] to [40], wherein the average fiber length of the cellulose fiber composite is 20 nm or more and 900 nm or less.

[42] The cellulose fiber composite according to any of the above [1] to [40], wherein the average fiber length of the cellulose fiber composite is 40 nm or more and 700 nm or less.

[43] The cellulose fiber composite according to any of the above [1] to [40], wherein the average fiber diameter of the cellulose fiber composite is 1 nm or more and 60 nm or less.

[44] The cellulose fiber composite according to any of the above [1] to [40], wherein the average fiber diameter of the cellulose fiber composite is 2 nm or more and 20 nm or less.

[45] A dispersion in which the cellulose fiber composite according to any of the above [1] to [44] is dispersed in a medium.

[46] A resin composition produced by blending the cellulose fiber composite according to any of the above [1] to [44] and a resin.

[47] A molded article produced by molding the cellulose fiber composite according to any of the above [1] to [44] or the resin composition according to the above [46].

[48] A method for producing the cellulose fiber composite according to any of the above [1] to [44], including mixing anion-modified cellulose fibers and at least one amine selected from a polyamine and a monoamine having a reactive functional group.

[49] The method for producing the cellulose fiber composite according to the above [48], further including disintegration treatment.

EXAMPLES

[Measurement of Average Polymerization Degree of Cellulose Fibers (Including Anion-Modified Cellulose Fibers)]

The average polymerization degree of cellulose fibers was measured as follows.

(1) Preparation of Solution for Measurement 0.1 g (dry mass) of the cellulose fibers targeted for measurement was accurately weighed, put into a 100-mL beaker, 50 mL of a 0.5 M copper ethylenediamine solution was added, and stirred for 1 hour until the cellulose completely dissolved to prepare a solution for measurement.

(2) Measurement of Average Polymerization Degree

The solution for measurement prepared in the above (1) was put into an Ubbelohde viscometer, left in a constant-temperature tank (20±0.1° C.) for 1 hour, and then the liquid flow time was measured.

From the flow time (t (sec)) of a copper ammonia solution having a different cellulose concentration (g/dL) and the flow time ($t_0$ (sec)) of a cellulose-free, aqueous copper ammonia solution, a relative viscosity ηr was determined according to the following formula.

$\eta r = t/t_0$

Next, the reduced viscosity (ηsp/c) at a different cellulose concentration was determined according to the following formula.

η$sp/c$=(η$r$−1)/$c$($c$:cellulose concentration (g/dL))

Further, the resultant reduced viscosity was extrapolated from c=0 to determine the intrinsic viscosity [η] (dL/g), and the average polymerization degree of the cellulose fibers was determined according to the following formula.

Average polymerization degree=2000×[η]

[Measurement of Average Fiber Length, Average Fiber Diameter, and Average Aspect Ratio of Cellulose Fibers (Including Anion-Modified Cellulose Fibers), and Shortened Cellulose Fibers]

Ion-exchanged water was added to the cellulose fibers targeted for measurement to provide a dispersion having a content thereof of 0.01% by mass. The dispersion was analyzed measured with a wet-dispersion type image analyzing particle sizer (manufactured by JASCO International Co., Ltd., trade name: IF-3200), under the conditions of a front lens: 2 folds, telecentric zoom lens: 1 fold, image resolution: 0.835 μm/pixel, syringe inner diameter: 6515 μm, spacer thickness: 1000 μm, image recognition mode: ghost, threshold value: 8, amount of sample to be analyzed: 1 mL, and sampling: 15%. Ten thousand or more cellulose fibers were analyzed, and an average ISO fiber length thereof was calculated as an average fiber length, an average ISO fiber diameter was calculated as an average fiber diameter, and an average aspect ratio was calculated.

[Measurement of Average Fiber Length, Average Fiber Diameter and Average Aspect Ratio of Cellulose Fiber Composite (Including Disintegrated One)]

A medium was added to the cellulose fiber composite targeted for measurement to provide a dispersion having a concentration of 0.0001% by mass. The dispersion was dripped onto mica and dried to prepare a sample for observation. Using an atomic force microscope ((AFM), Nanoscope III Tapping mode AFM, manufactured by Digital Instrument Corporation, with a probe of Point Probe (NCH) manufactured by Nanosensors Corporation), the fiber height of the cellulose fibers in the sample for observation was measured. During the measurement, 100 or more cellulose fibers were extracted from the microscopic image in which the cellulose fibers were confirmed, and an average fiber length and an average fiber diameter were measured therefrom. The average aspect ratio was calculated from the average fiber length and the average fiber diameter.

[Measurement of Anionic Group (Carboxy Group) Content in Anion-Modified Cellulose Fibers]

0.5 g, as a dry mass, of the cellulose fibers targeted for measurement were put in a 100-mL beaker, and ion-exchanged water or a mixed solvent of methanol/water=2/1 was added to make 55 mL in total, and 5 mL of an aqueous 0.01 M sodium chloride solution was added thereto to prepare a dispersion. The dispersion was stirred until the cellulose fibers were dispersed fully. 0.1 M hydrochloric acid was added to the dispersion to make pH falls 2.5 to 3, and using an automated titration device (manufactured by DKK-TOA Corporation, trade name: AUT-710), an aqueous 0.05 M sodium hydroxide solution was dropwise added to the dispersion under the conditions of a waiting time of 60 seconds. The values of electroconductivity and pH were measured every minute. The measurements were continued up to a pH of 11 so to give an electroconductivity curve. A titrated amount of sodium hydroxide was derived from this electroconductivity curve, and the content of the anionic group in the cellulose fibers targeted for measurement was calculated in accordance with the following formula.

Content of anionic group (mmol/g)=sodium hydroxide titer x concentration of aqueous sodium hydroxide solution (0.05 M)/mass of cellulose fibers targeted for measurement (0.5 g)

[Measurement of Average Bonding Amount and Introduction Ratio of Amine in Cellulose Fiber Composite]

A dried cellulose fiber composite was analyzed with a Fourier transform IR spectrophotometer (FT-IR) (manufactured by JASCO Corporation, trade name: FT/IR4600) according to an ATR method, and the average bonding amount of amin by ionic bonding was determined according to the following formula to calculate the amine introduction ratio.

In the following case, the anionic group is a carboxy group (—COOH). For the other case of an anionic group except the carboxy group, the peak intensity value is appropriately changed and the average bonding amount and the introduction ratio of amine may be thereby calculated.

Average bonding amount of amine (mmol/g)=[carboxy group content in cellulose fibers before amine introduction (mmol/g)]×[1−(peak intensity at 1720 cm$^{-1}$ of cellulose fibers after amine introduction/peak intensity at 1720 cm$^{-1}$ of cellulose fibers before amine introduction)]

Peak intensity at 1720 cm$^{-1}$: peak intensity derived from carbonyl group of carboxylic acid Amine introduction ratio (%)=[average bonding amount of amine (mmol/g)/carboxy group content in cellulose fibers before amine introduction (mmol/g)]×100

In the case where plural amines are bonded simultaneously, each amine introduction ratio is calculated from the above-mentioned amine introduction ratio. At that time, every amin existing during reaction is presumed to have reacted in proportion to the molar ratio of the amines.

<First Aspect of the Invention>

Preparation Example 1-1 (Preparation of Anion-Modified Cellulose Fibers 1-1)

100 g of needle-leaf bleached kraft pulp fibers (manufactured by West Fraser Corporation, trade name: Hinton) were fully stirred in 9,900 g of ion-exchanged water, and then, relative to 100 g of the pulp mass, 1.25 g of TEMPO (manufactured by Aldrich Corporation, free radical, 98% by mass), 12.5 g of sodium bromide and 37.2 g of sodium hypochlorite were added thereto in that order. Using a pH-stat, 0.5 M sodium hydroxide was dropwise added to keep pH 10.5. The reaction was performed at 20° C. for 80 minutes, and then dropwise addition of sodium hydroxide was stopped. Using 0.01 M hydrochloric acid and ion-exchanged water, the resultant cellulose fibers were fully washed, and then dewatered to give anion-modified cellulose fibers 1-1 (cellulose oxide fibers). The average fiber length of the anion-modified cellulose fibers 1-1 was 2022 µm, the average aspect ratio was 50, the carboxy group content was 1.5 mmol/g, and the average polymerization degree was 387.

Preparation Example 1-2 (Preparation of Shortened Anion-Modified Cellulose Fibers 1-2)

(1) Oxidation Treatment 100 g of Eucalyptus-derived broad-leaf bleached kraft pulp (manufactured by CENIBRA Corporation) was fully stirred in 9,900 g of ion-exchanged water, and then, relative to 100 g of the pulp mass, 1.25 g of TEMPO (manufactured by Aldrich Corporation, free radical, 98% by mass), 12.5 g of sodium bromide and 28.4 g of sodium hypochlorite were added thereto in that order. Using a pH-stat, 0.5 M sodium hydroxide was dropwise added to keep pH 10.5. The reaction was performed at 20° C. for 40 minutes, and then dropwise addition of sodium hydroxide was stopped. Using 0.01 M hydrochloric acid and ion-exchanged water, the resultant cellulose fibers were fully washed, and then dewatered to give cellulose oxide fibers. The average fiber length of the cellulose oxide fibers was 1058 µm, the average fiber diameter was 41 µm, and the carboxy group content was 1.3 mmol/g.

(2) Fiber Shortening Treatment 7.2 g, as an absolute dry mass, of the cellulose oxide fibers prepared in the above (1) were put into a vial container equipped with a magnetic stirrer and a stirring bar, and ion-exchanged water was added thereto until the mass of the process liquid could reach 360 g. The process liquid was stirred at 95° C. for 24 hours and then dewatered to give shortened anion-modified cellulose fibers 1-2. The average fiber length of the anion-modified cellulose fibers 1-2 was 133 µm, the average fiber diameter was 35 µm, the average aspect ratio was 4.5, the carboxy group content was 1.3 mmol/g, and the average polymerization degree was 89.

Example 1-1

(1) Preparation of Cellulose Fiber Composite 0.15 g, as an absolute dry mass, of the anion-modified cellulose fibers 1-1 prepared in Preparation Example 1-1 were put into a beaker equipped with a magnetic stirrer and a stirring bar. Subsequently, 0.09 g of an aliphatic polyether diamine (manufactured by U.S. Huntsman Corporation, trade name: Jeffamine D-2000) and 0.36 g of an aliphatic monoamine (manufactured by U.S. Huntsman Corporation, trade name: Jeffamine M-2070) were added, and dissolved in 30 g of water. The resultant mixture was stirred at room temperature (25° C.) for 1 hour to give a suspension of a cellulose fiber composite with a polyamine bonding to anion-modified cellulose fibers (content of cellulose fibers (modifying group omitted) 0.5% by mass).

(2) Disintegration Treatment

The suspension prepared in the above (1) was disintegrated for a total of 5 passes each under 150 MPa, using a high-pressure homogenizer (manufactured by Yoshida Kikai Co., Ltd., trade name: Nanovater L-ES).

As a result of this treatment, a fine cellulose fiber composite dispersion dispersed in water (content of cellulose fibers (modifying group omitted) 0.5% by mass) was produced. The average fiber length of the fine cellulose fiber composite was 542 nm, the average fiber diameter was 3.2 nm, and the average aspect ratio was 169.

Examples 1-2 to 1-22, Comparative Examples 1-1 to 1-4

Fine cellulose fiber composite dispersions dispersed in various solvents (content of cellulose fibers (modifying group omitted) 0.5% by mass) were produced in the same manner as in Example 1-1, except that, in Example 1-1, the anion-modified cellulose fiber amount was kept constant and the other conditions were varied as in Table 1 and Table 2.

The properties of the resultant fine cellulose fiber composites were evaluated according to the methods of Test Examples 1-1 and 1-2 mentioned below. The results are shown in Table 1 and Table 2.

Test Example 1-1 (Dispersion Stability Test)

The resultant fine cellulose fiber composite dispersion was left at room temperature (25° C.) for 1 day, then visually checked for the transparency and the presence or absence of precipitates, and evaluated based on the following evaluation criteria
(Evaluation Criteria)
    A: Transparent with no precipitate.
    B: Somewhat cloudy but no precipitate formed.
    C: A part of cellulose fibers formed a precipitate.
    Rank A means extremely excellent nano-level dispersion stability, and Rank B means practicable dispersion stability.

Test Example 1-2 (Viscosity Increase Performance Evaluation Test)

The viscosity of the cellulose fiber composite having a cellulose fiber content (modifying group omitted) of 0.5% by mass was measured using an E-type viscometer (by Told Sangyo Co., Ltd., VISCOMETER TVE-3511, using cone rotor: 1° 34'×R24) and a temperature regulator (manufactured by Toki Sangyo Co., Ltd., VISCOMATE VM-150III) under the condition of 25° C., 1 rpm and 1 minute.

Samples having a higher viscosity value measured are more excellent in viscosity increase performance.

Details of the components in Table 1 and Table 2 are as follows.

D-2000: manufactured by U.S. Huntsman Corporation, Jeffamine D-2000: diamine of the formula (1), a: ~33, weight-average molecular weight 2000

ED-600: manufactured by U.S. Huntsman Corporation, Jeffamine ED-600: diamine of the formula (2), a+c: ~3.6, b: ~9, weight-average molecular weight 600

M-2070: manufactured by U.S. Huntsman Corporation, Jeffamine M-2070: monoamine of the formula (3), PO/EO molar ratio (y/x)=10/31, weight-average molecular weight 2000

M-600: by U.S. Huntsman Corporation, Jeffamine M-600: monoamine of the formula (3), PO/E0 molar ratio (y/x)=9/1, weight-average molecular weight 600

MEK: methyl ethyl ketone
IPA: 2-propanol
DMF: N,N-dimethylformamide
TPMA: tritylamine
DAA: diallylamine
6-DMA-1-H: 6-dimethylamino-1-hexanol
2-DMAEA: 2-dimethylaminoethyl acrylate

TABLE 1

| | | \multicolumn{7}{c}{Example} | | | | | | |
|---|---|---|---|---|---|---|---|---|
| | | 1-1 | 1-2 | 1-3 | 1-4 | 1-5 | 1-6 | 1-7 |
| Anion-modified Cellulose Fibers (A) | Preparation Example | 1-1 (long fibers) | 1-1 (long fibers) | 1-1 (long-fibers) | 1-1 (long fibers) | 1-1 (long fibers) | 1-1 (long fibers) | 1-1 (long-fibers) |
| | Average Polymerization Degree | 387 | 387 | 387 | 387 | 387 | 387 | 387 |
| | Anionic Group | —COOH | —COOH | —COOH | —COOH | —COOH | —COOH | —COOH |
| | Anionic Group Content (mmol/g) | 1.5 | 1.5 | 1.5 | 1.5 | 1.5 | 1.5 | 1.5 |
| Polyamine (B-1) | Solvent | water | DMF | DMF | DMF | DMF | DMF | IPA |
| | Kind | D-2000 | ED-600 | ED-600 | D-2000 | ED-600 | ED-600 | ED-600 |
| | Weight-average Molecular Weight | 2000 | 600 | 600 | 2000 | 600 | 600 | 600 |
| | Introduction Ratio (%) | 20 | 20 | 40 | 20 | 20 | 20 | 20 |
| Monoamine (C) not having reactive functional group | Kind | M-2070 | M-2070 | M-2070 | M-2070 | M-600 | M-2070 | M-2070 |
| | Weight-average Molecular Weight | 2000 | 2000 | 2000 | 2000 | 600 | 2000 | 2000 |
| | Introduction Ratio (%) | 80 | 80 | 60 | 80 | 80 | 80 | 80 |
| Proportion of Introduction Ratio of Monoamine not having reactive functional group*1 | | 4 | 4 | 1.5 | 4 | 4 | 4 | 4 |
| Ratio by mass | (B-1)/(A) | 0.6 | 0.2 | 0.4 | 0.6 | 0.2 | 0.2 | 0.2 |
| | (C)/(A) | 2.4 | 2.4 | 1.8 | 2.4 | 0.7 | 2.4 | 2.4 |
| Dispersion of Cellulose Fiber Composite | Cellulose Content (mass %)*2 | 0.5 | 0.5 | 0.5 | 0.5 | 0.5 | 1 | 0.5 |
| | Dispersion Stability | A | A | A | A | A | A | B |
| | Viscosity (mPa · s) | 17 | 54 | 160 | 404 | 582 | 287 | 41 |

| | | \multicolumn{4}{c}{Example} | \multicolumn{2}{c}{Comparative Example} | |
|---|---|---|---|---|---|---|---|
| | | 1-8 | 1-9 | 1-10 | 1-11 | 1-1 | 1-2 |
| Anion-modified Cellulose Fibers (A) | Preparation Example | 1-1 (long-fibers) | 1-1 (long fibers) | 1-2 (hot-water treatment) | 1-1 (long fibers) | 1-1 (long fibers) | 1-1 (long fibers) |
| | Average Polymerization Degree | 387 | 387 | 89 | 387 | 387 | 387 |
| | Anionic Group | —COOH | —COOH | —COOH | —COOH | —COOH | —COOH |
| | Anionic Group Content (mmol/g) | 1.5 | 1.5 | 1.3 | 1.5 | 1.5 | 1.5 |
| Polyamine (B-1) | Solvent | MEK | water | DMF | DMF | water | water |
| | Kind | ED-600 | ED-600 | ED-600 | ED-600 | D-2000 | D-2000 |
| | Weight-average Molecular Weight | 600 | 600 | 600 | 600 | 2000 | 2000 |
| | Introduction Ratio (%) | 20 | 50 | 20 | 50 | 100 | 70 |
| Monoamine (C) not having reactive functional group | Kind | M-2070 | — | M-2070 | TPMA | — | — |
| | Weight-average Molecular Weight | 2000 | — | 2000 | 259 | — | — |
| | Introduction Ratio (%) | 80 | — | 80 | 50 | — | — |
| Proportion of Introduction Ratio of Monoamine not having reactive functional group*1 | | 4 | 0 | 4 | 1 | 0 | 0 |
| Ratio by mass | (B-1)/(A) | 0.2 | 0.5 | 0.2 | 0.5 | 3.0 | 2.1 |
| | (C)/(A) | 2.4 | — | 2.1 | 0.2 | — | — |
| Dispersion of Cellulose Fiber Composite | Cellulose Content (mass %)*2 | 0.5 | 0.5 | 0.5 | 0.5 | 0.5 | 0.5 |
| | Dispersion Stability | B | A | A | B | C | C |
| | Viscosity (mPa · s) | 197 | 25 | 8 | 1353 | <1 | <1 |

*1Proportion of (introduction ratio of monoamine not having reactive functional group/total introduction ratio of polyamine and monoamine having reactive functional group)
*2Content of cellulose fibers not containing modifying group

TABLE 2

| | | \multicolumn{7}{c}{Example} | | | | | | |
|---|---|---|---|---|---|---|---|---|
| | | 1-12 | 1-13 | 1-14 | 1-15 | 1-16 | 1-17 | 1-18 |
| Anion-modified Cellulose Fibers (A) | Preparation Example | 1-1 (long fibers) | 1-1 (long fibers) | 1-1 (long fibers) | 1-1 (long fibers) | 1-1 (long fibers) | 1-1 (long fibers) | 1-1 (long fibers) |
| | Average Polymerization Degree | 387 | 387 | 387 | 387 | 387 | 387 | 387 |
| | Anionic Group | —COOH | —COOH | —COOH | —COOH | —COOH | —COOH | —COOH |
| | Anionic Group Content (mmol/g) | 1.5 | 1.5 | 1.5 | 1.5 | 1.5 | 1.5 | 1.5 |

TABLE 2-continued

| | | | | | | | | |
|---|---|---|---|---|---|---|---|---|
| Polyamine (B-1) | Solvent | — | — | — | — | — | — | — |
| | Kind | — | — | — | — | — | — | — |
| | Weight-average Molecular Weight | — | — | — | — | — | — | — |
| | Introduction Ratio (%) | — | — | — | — | — | — | — |
| Monoamine (B-2) having reactive functional group | Solvent | DMF | DMF | DMF | DMF | DMF | DMF | DMF |
| | Kind | DAA | 6-DMA-1-H | 6-DMA-1-H | 6-DMA-1-H | 2-DMA EA | 2-DMA EA | 2-DMA EA |
| | Molecular Weight | 97 | 145 | 145 | 145 | 143 | 143 | 143 |
| | Introduction Ratio (%) | 20 | 50 | 20 | 20 | 50 | 20 | 20 |
| Monoamine (C-1) not having reactive functional group | Kind | M-2070 | — | M-2070 | TPMA | — | M-2070 | TPMA |
| | Weight-average Molecular Weight | 2000 | — | 2000 | 259 | — | 2000 | 259 |
| | Introduction Ratio (%) | 80 | — | 80 | 30 | — | 80 | 30 |
| Monoamine (C-2) not having reactive functional group | Kind | — | — | — | M-2070 | — | — | M-2070 |
| | Weight-average Molecular Weight | — | — | — | 2000 | — | — | 2000 |
| | Introduction Ratio (%) | — | — | — | 50 | — | — | 50 |
| Proportion of Introduction Ratio of Monoamine not having reactive functional group*1 | | 4 | 0 | 4 | 4 | 0 | 4 | 4 |
| Ratio by mass | (B-1)/(A) | — | — | — | — | — | — | — |
| | (B-2)/(A) | 0.03 | 0.11 | 0.04 | 0.04 | 0.11 | 0.04 | 0.04 |
| | (C-1)/(A) | 2.4 | — | 2.4 | 0.1 | — | 2.4 | 0.1 |
| | (C-2)/(A) | — | — | — | 1.5 | — | — | 1.5 |
| Dispersion of Cellulose Fiber Composite | Cellulose Content (mass %)*2 | 0.5 | 0.5 | 0.5 | 0.5 | 0.5 | 0.5 | 0.5 |
| | Dispersion Stability | A | B | A | A | B | A | A |
| | Viscosity (mPa·s) | 93 | 814 | 10 | 7 | 2575 | 32 | 28 |

| | | | Example | | | | Comparative Example | |
|---|---|---|---|---|---|---|---|---|
| | | | 1-19 | 1-20 | 1-21 | 1-22 | 1-3 | 1-4 |
| Anion-modified Cellulose Fibers (A) | | Preparation Example | 1-1 (long fibers) | 1-1 (long fibers) | 1-1 (long fibers) | 1-1 (long fibers) | 1-1 (long fibers) | 1-1 (long fibers) |
| | | Average Polymerization Degree | 387 | 387 | 387 | 387 | 387 | 387 |
| | | Anionic Group | —COOH | —COOH | —COOH | —COOH | —COOH | —COOH |
| | | Anionic Group Content (mmol/g) | 1.5 | 1.5 | 1.5 | 1.5 | 1.5 | 1.5 |
| Polyamine (B-1) | | Solvent | ethyl acetate | ethyl acetate | ethyl acetate | ethyl acetate | DMF | ethyl acetate |
| | | Kind | ED-600 | D-2000 | ED-600 | D-2000 | ED-600 | ED-600 |
| | | Weight-average Molecular Weight | 600 | 2000 | 600 | 2000 | 600 | 600 |
| | | Introduction Ratio (%) | 10 | 10 | 10 | 10 | 100 | 100 |
| Monoamine (B-2) having reactive functional group | | Solvent | — | — | — | — | — | — |
| | | Kind | — | — | — | — | — | — |
| | | Molecular Weight | — | — | — | — | — | — |
| | | Introduction Ratio (%) | — | — | — | — | — | — |
| Monoamine (C-1) not having reactive functional group | | Kind | M-2070 | M-2070 | TPMA | TPMA | — | — |
| | | Weight-average Molecular Weight | 2000 | 2000 | 259 | 259 | — | — |
| | | Introduction Ratio (%) | 90 | 90 | 10 | 10 | — | — |
| Monoamine (C-2) not having reactive functional group | | Kind | — | — | M-2070 | M-2070 | — | — |
| | | Weight-average Molecular Weight | — | — | 2000 | 2000 | — | — |
| | | Introduction Ratio (%) | — | — | 80 | 80 | — | — |
| Proportion of Introduction Ratio of Monoamine not having reactive functional group*1 | | | 9 | 9 | 9 | 9 | 0 | 0 |
| Ratio by mass | | (B-1)/(A) | 0.1 | 0.3 | 0.1 | 0.3 | 0.9 | 0.9 |
| | | (B-2)/(A) | — | — | — | — | — | — |
| | | (C-1)/(A) | 2.7 | 2.7 | 0.0 | 0.0 | — | — |
| | | (C-2)/(A) | — | — | 2.4 | 2.4 | — | — |
| Dispersion of Cellulose Fiber Composite | | Cellulose Content (mass %)*2 | 0.5 | 0.5 | 0.5 | 0.5 | 0.5 | 0.5 |
| | | Dispersion Stability | B | B | B | B | C | C |
| | | Viscosity (mPa·s) | 1694 | 612 | 527 | 1429 | <1 | <1 |

*1 Proportion of (introduction ratio of monoamine not having reactive functional group/total introduction ratio of polyamine and monoamine having reactive functional group)
*2 Content of cellulose fibers not containing modifying group From Table 1 and Table 2, it is known that, in the dispersions containing a cellulose fiber composite having an introduction ratio of the amine represented by the formula (1) of 60% or less, the cellulose fiber composite does not aggregate, and therefore the dispersions are excellent in dispersion stability and secure improved viscosity increase.

Example 1-23 (Preparation of Monomer Composition)

20 g of the fine cellulose fiber composite dispersion dispersed in DMF obtained in Examples 1-5 (1 g of fine cellulose fibers) and 10 g, as an absolute dry mass, of a matrix component of an acrylic monomer (hexanediol diacrylate, viscosity 6 mPa·s) were mixed, and stirred for 3 minutes and defoamed for 3 minutes, using a rotation/revolution type stirrer (manufactured by Thinky Corporation, trade name: Awatori Neritaro). Subsequently, DMF was completely removed using an evaporator to give an acryl monomer composition containing a fine cellulose fiber composite (content of cellulose fibers (modifying group omitted): 1% by mass relative to the monomer). The results are shown in Table 3.

Examples 1-24 to 1-25, Comparative Example 1-5

Monomer compositions of a fine cellulose fiber composite blended in various matrix components (content of cellulose fibers: 1% by mass relative to monomer) were produced in the same manner as in Example 1-23, except that in Example 1-23, the kind of the fine cellulose fiber composite dispersion and the matrix component to be used were changed as in the combinations shown in Table 3. The results are shown in Table 3.

Examples 1-26 to 1-28, Comparative Example 1-6

Monomer compositions of a fine cellulose fiber composite blended in various matrix components (content of cellulose fibers (modifying group omitted): 1% by mass relative to the monomer) were produced in the same manner as in Example 1-23, except that in Example 1-23, an epoxy monomer (manufactured by Mitsubishi Chemical Corporation, bisphenol F-type liquid-type, trade name: jER807, viscosity 6300 mPa·s) was used as the matrix component, and the kind of the fine cellulose fiber composite dispersion to be used was changed as in the combinations shown in Table 3. The results are shown in Table 3.

From Table 3, it is known that, in the monomer compositions prepared by blending a cellulose fiber composite where the introduction ratio of the amine represented by the formula (1) is 60% or more and a resin, the cellulose fiber composite does not aggregate, and therefore the compositions secure improved viscosity increase.

<Second Aspect of the Invention>

Preparation Example 2-1 (Preparation of Anion-Modified Cellulose Fibers 2-1)

(1) Oxidation Treatment 100 g of Eucalyptus-derived broad-leaf bleached kraft pulp (manufactured by CENIBRA Corporation) was fully stirred in 9,900 g of ion-exchanged water, and then, relative to 100 g of the pulp mass, 1.25 g of TEMPO (manufactured by Aldrich Corporation, free radical, 98% by mass), 12.5 g of sodium bromide and 28.4 g of sodium hypochlorite were added thereto in that order. Using a pH-stat, 0.5 M sodium hydroxide was dropwise added to keep pH 10.5. The reaction was performed at 20° C. for 40 minutes, and then dropwise addition of sodium hydroxide was stopped. Using 0.01 M hydrochloric acid and ion-exchanged water, the resultant cellulose fibers were fully washed, and then dewatered to give cellulose oxide fibers. The average fiber length of the cellulose oxide fibers was 1058 μm, the average fiber diameter was 41 μm, and the carboxy group content was 1.3 mmol/g.

(2) Fiber Shortening Treatment 7.2 g, as an absolute dry mass, of the cellulose oxide fibers prepared in the above (1) were put into a vial container equipped with a magnetic stirrer and a stirring bar, and ion-exchanged water was added thereto until the mass of the process liquid could reach 360 g. The resultant mixture was stirred at 95° C. for 24 hours and then dewatered to give shortened anion-modified cellulose fibers 2-1. The average fiber length of the anion-modified cellulose fibers 2-1 was 133 μm, the average aspect ratio was 3.3, the carboxy group content was 1.3 mmol/g, and the average polymerization degree was 89.

Preparation Example 2-2

(1) Oxidation Treatment 100 g of needle-leaf bleached kraft pulp fibers (manufactured by West Fraser Corporation, trade name: Hinton) were fully stirred in 9,900 g of ion-exchanged water, and then,

TABLE 3

| | Example | | | Comparative Example | Example | | | Comparative Example |
|---|---|---|---|---|---|---|---|---|
| | 1-23 | 1-24 | 1-25 | 1-5 | 1-26 | 1-27 | 1-28 | 1-6 |
| Resin Monomer | acrylic monomer | acrylic monomer | acrylic monomer | acrylic monomer | epoxy monomer | epoxy monomer | epoxy monomer | epoxy monomer |
| Preparation Example for Cellulose Fiber Composite Dispersion | Example 1-5 | Example 1-13 | Example 1-15 | Comparative Example 1-3 | Example 1-5 | Example 1-20 | Example 1-21 | Comparative Example 1-4 |
| Average Polymerization Degree*1 | 387 | 387 | 387 | 387 | 387 | 387 | 387 | 387 |
| Amine Introduction Ratio (%)*2 | 20 | 50 | 20 | 100 | 20 | 10 | 10 | 100 |
| Viscosity of Monomer Composition (mPa · s) | 5640 | >30000 | >30000 | 3230 | 12790 | 27820 | 18920 | 7090 |

*1Average polymerization degree of anion-modified cellulose fibers (A)
*2Introduction ratio of at least one amine selected from polyamine and monoamine having reactive functional group (%)

relative to 100 g of the pulp fibers, 1.25 g of TEMPO (manufactured by Aldrich Corporation, free radical, 98% by mass), 12.5 g of sodium bromide and 37.2 g of sodium hypochlorite were added thereto in that order. Using a pH-stat, 0.5 M sodium hydroxide was dropwise added to keep pH 10.5. The reaction was performed at 20° C. for 80 minutes, and then dropwise addition of sodium hydroxide was stopped. Using 0.01 M hydrochloric acid and ion-exchanged water, the resultant cellulose fibers were fully washed, and then dewatered to give cellulose oxide fibers. The average fiber length of the cellulose oxide fibers was 2022 μm, the average aspect ratio was 50, the carboxy group content was 1.5 mmol/g, and the average polymerization degree was 387.

(2) Fiber Shortening Treatment 7.2 g, as an absolute dry mass, of the cellulose oxide fibers prepared in the above (1), 10.8 g, as a hydrogen chloride amount, of hydrochloric acid were put into a vial container equipped with a magnetic stirrer and a stirring bar, and ion-exchanged water was added thereto until the mass of the process liquid could reach 360 g. The resultant mixture was stirred at 95° C. for 24 hours, then fully washed and dewatered to give anion-modified cellulose fibers 2-2.

The average fiber length of the resultant anion-modified cellulose fibers 2-2 was 186 μm, the average aspect ratio was 4.5, the carboxy group content was 1.5 mmol/g, and the average polymerization degree was 163.

Preparation Example 2-3 (Preparation of Anion-Modified Cellulose Fibers 2-3)

Anion-modified cellulose fibers 2-3 were produced in the same oxidation treatment alone as in Preparation Example 2-2(1) but not undergoing the fiber-shortening treatment of Preparation Example 2-2(2).

The average fiber length of the resultant anion-modified cellulose fibers 2-3 was 2022 μm, the average aspect ratio was 50, the carboxy group content was 1.5 mmol/g, and the average polymerization degree was 387.

Preparation Example 2-4 (Preparation of Anion-Modified Cellulose Fibers 2-4)

Anion-modified cellulose fibers 2-4 were produced in the same oxidation treatment as in Preparation Example 2-2(1) followed by the same fiber-shortening treatment as in Preparation Example 2-1(2).

The average fiber length of the resultant anion-modified cellulose fibers 2-4 was 210 μm, the aspect ratio was 4.6, the carboxy group content was 1.5 mmol/g, and the average polymerization degree was 187.

Example 2-1

(1) Preparation of Cellulose Fiber Composite

Water in the anion-modified cellulose fibers 2-1 prepared in Preparation Example 2-1 was substituted with ethanol, and 0.15 g, as an absolute dry mass, of the resultant anion-modified cellulose fibers were put into a beaker equipped with a magnetic stirrer and a stirring bar. Subsequently, 0.39 g of an aliphatic polyether diamine (manufactured by U.S. Huntsman Corporation, trade name: Jeffamine D-2000) was added, and dissolved in 30 g of N,N-dimethylformamide (DMF). The resultant mixture was stirred at room temperature (25° C.) for 1 hour to give a suspension of a cellulose fiber composite with a polyamine bonding to anion-modified cellulose fibers (content of cellulose fibers (modifying group omitted) 0.5% by mass).

(2) Disintegration Treatment

The suspension prepared in the above (1) was disintegrated for a total of 5 passes each under 150 MPa, using a high-pressure homogenizer (manufactured by Yoshida Kikai Co., Ltd., trade name: Nanovater L-ES).

As a result of this treatment, a fine cellulose fiber composite dispersion dispersed in DMF (content of cellulose fibers (modifying group omitted) 0.5% by mass) was produced. The average fiber length of the fine cellulose fiber composite was 117 nm, the average fiber diameter was 3.5 nm, and the average aspect ratio was 37.

Examples 2-2 to 2-25, Comparative Examples 2-1 to 2-3

Fine cellulose fiber composite dispersions dispersed in various solvents (content of cellulose fibers 0.5% by mass) were produced in the same manner as in Example 2-1, except that, in Example 2-1, the anion-modified cellulose fiber amount was kept constant and the other conditions were varied as in Table 4 and Table 5.

The properties of the resultant fine cellulose fiber composites were evaluated according to the methods of Test Examples 2-1 and 2-2 mentioned below. The results are shown in Table 4 and Table 5.

Details of the components in Table 4 and Table 5 are the same as in Table 1 and Table 2. In Table 5, monoamine (C-1) OA is octylamine.

Test Example 2-1 (Dispersion Stability Test)

The resultant fine cellulose fiber composite dispersion was left at room temperature (25° C.) for 1 day, then visually checked for the transparency and the presence or absence of precipitates, and evaluated based on the following evaluation criteria (Evaluation Criteria)
A: Transparent with no precipitate.
B: Somewhat cloudy but no precipitate formed.
C: A part of cellulose fibers formed a precipitate.

Rank A means extremely excellent nano-level dispersion stability, and Rank B means practicable dispersion stability.

Test Example 2-2 (Transparency Evaluation Test)

The light transmission rate of the dispersions obtained in Examples and Comparative Examples was measured in the manner mentioned below to evaluate the transparency thereof. The light transmission rate was measured at room temperature under normal pressure.

Specifically, 30 mL of each dispersion immediately after dispersion treatment was transferred into a 30-mL screw tube (No. 7 manufactured by AS ONE Corporation), and the dispersion was shaken along with the screw tube, and 3 mL of the sample that had become visually uniform was put into a quartz cell having a light path length of 10 mm, and immediately the light absorbance thereof at a wavelength of 660 nm was measured using a double beam spectrophotometer (by manufactured Hitachi High-Tech Science Corporation, "U-2910"). The medium used in preparing the dispersion was taken as a blank (that is, having a light transmission rate of 100%), and the light transmission rate (%) of each dispersion was determined from the light absorbance thereof.

TABLE 4

|  |  | Example |  |  |  |  |  |  |
|---|---|---|---|---|---|---|---|---|
|  |  | 2-1 | 2-2 | 2-3 | 2-4 | 2-5 | 2-6 | 2-7 |
| Anion-modified Cellulose Fibers (A) | Preparation Example | 2-1 (hot water treatment) | 2-1 (hot water treatment) | 2-1 (hot water treatment) | 2-1 (hot water treatment) | 2-1 (hot water treatment) | 2-1 (hot water treatment) | 2-2 (acid hydrolysis) |
|  | Average Polymerization Degree | 89 | 89 | 89 | 89 | 89 | 89 | 163 |
|  | Anionic Group | —COOH | —COOH | —COOH | —COOH | —COOH | —COOH | —COOH |
|  | Anionic Group Content (mmol/g) | 1.3 | 1.3 | 1.3 | 1.3 | 1.3 | 1.3 | 1.5 |
| Polyamine (B-1) | Solvent | DMF | water | IPA | MEK | DMF | DMF | DMF |
|  | Kind | D-2000 | D-2000 | D-2000 | D-2000 | D-2000 | ED-600 | D-2000 |
|  | Weight-average Molecular Weight | 2000 | 2000 | 2000 | 2000 | 2000 | 600 | 2000 |
|  | Introduction Ratio (%) | 100 | 100 | 100 | 100 | 100 | 100 | 100 |
| Monoamine (B-2) having reactive functional group | Solvent | — | — | — | — | — | — | — |
|  | Kind | — | — | — | — | — | — | — |
|  | Molecular Weight | — | — | — | — | — | — | — |
|  | Introduction Ratio (%) | — | — | — | — | — | — | — |
| Proportion of Introduction Ratio of Monoamine not having reactive functional group*1 |  | 0 | 0 | 0 | 0 | 0 | 0 | 0 |
| Ratio by mass | (B-1)/(A) | 2.6 | 2.6 | 2.6 | 2.6 | 2.6 | 0.8 | 3.0 |
|  | (B-2)/(A) | — | — | — | — | — | — | — |
| Dispersion of Cellulose Fiber Composite | Cellulose Content (mass %)*2 | 0.5 | 0.5 | 0.5 | 0.5 | 2 | 0.5 | 0.5 |
|  | Dispersion Stability | A | A | B | B | B | A | A |
|  | Light Transmittance Rate (%) | 23 | 28 | 12 | 14 | 11 | 25 | 29 |

|  |  | Example |  |  | Comparative Example |  |
|---|---|---|---|---|---|---|
|  |  | 2-8 | 2-9 | 2-10 | 2-1 | 2-2 |
| Anion-modified Cellulose Fibers (A) | Preparation Example | 2-1 (hot water treatment) | 2-1 (hot water treatment) | 2-1 (hot water treatment) | 2-3 (long fibers) | 2-3 (long fibers) |
|  | Average Polymerization Degree | 89 | 89 | 89 | 387 | 387 |
|  | Anionic Group | —COOH | —COOH | —COOH | —COOH | —COOH |
|  | Anionic Group Content (mmol/g) | 1.3 | 1.3 | 1.3 | 1.5 | 1.5 |
| Polyamine (B-1) | Solvent | — | — | — | water | DMF |
|  | Kind | — | — | — | D-2000 | D-2000 |
|  | Weight-average Molecular Weight | — | — | — | 2000 | 2000 |
|  | Introduction Ratio (%) | — | — | — | 100 | 100 |
| Monoamine (B-2) having reactive functional group | Solvent | DMF | DMF | DMF | — | — |
|  | Kind | 6-DMA-1-H | 2-DMA EA | DAA | — | — |
|  | Molecular Weight | 145 | 143 | 97 | — | — |
|  | Introduction Ratio (%) | 100 | 100 | 100 | — | — |
| Proportion of Introduction Ratio of Monoamine not having reactive functional group*1 |  | 0 | 0 | 0 | 0 | 0 |
| Ratio by mass | (B-1)/(A) | — | — | — | 3.0 | 3.0 |
|  | (B-2)/(A) | 0.2 | 0.2 | 0.1 | — | — |
| Dispersion of Cellulose Fiber Composite | Cellulose Content (mass %)*2 | 0.5 | 0.5 | 0.5 | 0.5 | 0.5 |
|  | Dispersion Stability | A | A | A | C | C |
|  | Light Transmittance Rate (%) | 47 | 77 | 38 | 0 | 0 |

*1 Proportion of (introduction ratio of monoamine not having reactive functional group/total introduction ratio of polyamine and monoamine having reactive functional group)
*2 Content of cellulose fibers not containing modifying group

TABLE 5

| | | Example | | | | | |
|---|---|---|---|---|---|---|---|
| | | 2-11 | 2-12 | 2-13 | 2-14 | 2-15 | 2-16 |
| Anion-modified Cellulose Fibers (A) | Preparation Example | 2-1 (hot water treatment) | 2-1 (hot water treatment) | 2-1 (hot water treatment) | 2-1 (hot water treatment) | 2-1 (hot water treatment) | 2-1 (hot water treatment) |
| | Average Polymerization Degree | 89 | 89 | 89 | 89 | 89 | 89 |
| | Anionic Group | —COOH | —COOH | —COOH | —COOH | —COOH | —COOH |
| | Anionic Group Content (mmol/g) | 1.3 | 1.3 | 1.3 | 1.3 | 1.3 | 1.3 |
| Polyamine (B-1) | Solvent | DMF | DMF | DMF | DMF | DMF | DMF |
| | Kind | D-2000 | D-2000 | D-2000 | D-2000 | ED-600 | ED-600 |
| | Weight-average Molecular Weight | 2000 | 2000 | 2000 | 2000 | 600 | 600 |
| | Introduction Ratio (%) | 20 | 20 | 20 | 20 | 20 | 20 |
| Monoamine (B-2) having reactive functional group | Solvent | — | — | — | — | — | — |
| | Kind | — | — | — | — | — | — |
| | Molecular Weight | — | — | — | — | — | — |
| | Introduction Ratio (%) | — | — | — | — | — | — |
| Monoamine (C-1) not having reactive functional group | Kind | OA | M-600 | M-2070 | TPMA | M-2070 | TPMA |
| | Molecular Weight | 130 | 600 | 2000 | 259 | 2000 | 259 |
| | Introduction Ratio (%) | 80 | 80 | 80 | 80 | 80 | 80 |
| Monoamine (C-2) not having reactive functional group | Kind | — | — | — | — | — | — |
| | Weight-average Molecular Weight | — | — | — | — | — | — |
| | Introduction Ratio (%) | — | — | — | — | — | — |
| Proportion of Introduction Ratio of Monoamine not having reactive functional group*1 | | 4 | 4 | 4 | 4 | 4 | 4 |
| Ratio by mass | (B-1)/(A) | 0.5 | 0.5 | 0.5 | 0.5 | 0.2 | 0.2 |
| | (B-2)/(A) | — | — | — | — | — | — |
| | (C-1)/(A) | 0.1 | 0.6 | 2.1 | 0.3 | 2.1 | 0.3 |
| | (C-2)/(A) | — | — | — | — | — | — |
| Dispersion of Cellulose Fiber Composite | Cellulose Content (mass %)*2 | 0.5 | 0.5 | 0.5 | 0.5 | 0.5 | 0.5 |
| | Dispersion Stability | A | A | A | A | A | B |
| | Light Transmittance Rate (%) | 53 | 64 | 76 | 88 | 79 | 11 |

| | | Example | | | | | |
|---|---|---|---|---|---|---|---|
| | | 2-17 | 2-18 | 2-19 | 2-20 | 2-21 | 2-22 |
| Anion-modified Cellulose Fibers (A) | Preparation Example | 2-2 (acid hydrolysis) | 2-1 (hot water treatment) | 2-1 (hot water treatment) | 2-1 (hot water treatment) | 2-1 (hot water treatment) | 2-1 (hot water treatment) |
| | Average Polymerization Degree | 89 | 89 | 89 | 89 | 89 | 89 |
| | Anionic Group | —COOH | —COOH | —COOH | —COOH | —COOH | —COOH |
| | Anionic Group Content (mmol/g) | 1.3 | 1.3 | 1.3 | 1.3 | 1.3 | 1.3 |
| Polyamine (B-1) | Solvent | — | — | — | — | ethyl acetate | ethyl acetate |
| | Kind | — | — | — | — | ED-600 | ED-600 |
| | Weight-average Molecular Weight | — | — | — | — | 600 | 600 |
| | Introduction Ratio (%) | — | — | — | — | 10 | 20 |
| Monoamine (B-2) having reactive functional group | Solvent | DMF | DMF | DMF | DMF | — | — |
| | Kind | 6-DMA-1-H | 2-DMA EA | 6-DMA-1-H | 2-DMA EA | — | — |
| | Molecular Weight | 145 | 143 | 145 | 143 | — | — |
| | Introduction Ratio (%) | 20 | 20 | 20 | 20 | — | — |
| Monoamine (C-1) not having reactive functional group | Kind | M-2070 | M-2070 | TPMA | TPMA | TPMA | TPMA |
| | Molecular Weight | 2000 | 2000 | 259 | 259 | 259 | 259 |
| | Introduction Ratio (%) | 80 | 80 | 30 | 30 | 60 | 30 |
| Monoamine (C-2) not having reactive functional group | Kind | — | — | M-2070 | M-2070 | M-2070 | M-2070 |
| | Weight-average Molecular Weight | — | — | 2000 | 2000 | 2000 | 2000 |
| | Introduction Ratio (%) | — | — | 50 | 50 | 30 | 50 |
| Proportion of Introduction Ratio of Monoamine not having reactive functional group*1 | | 4 | 4 | 4 | 4 | 9 | 4 |
| Ratio by mass | (B-1)/(A) | — | — | — | — | 0.1 | 0.2 |
| | (B-2)/(A) | 0.04 | 0.04 | 0.04 | 0.04 | — | — |
| | (C-1)/(A) | 2.1 | 2.1 | 0.1 | 0.1 | 0.2 | 0.1 |
| | (C-2)/(A) | — | — | 1.3 | 1.3 | 0.2 | 0.8 |

TABLE 5-continued

| | | | | | | | |
|---|---|---|---|---|---|---|---|
| Dispersion of Cellulose Fiber Composite | Cellulose Content (mass %)*2 | 0.5 | 0.5 | 0.5 | 0.5 | 0.5 | 0.5 |
| | Dispersion Stability | A | A | A | A | A | B |
| | Light Transmittance Rate (%) | 95 | 95 | 95 | 95 | 53 | 13 |

| | | | Example | | | Comparative Example | |
|---|---|---|---|---|---|---|---|
| | | | 2-23 | 2-24 | 2-25 | 2-2 | 2-3 |
| Anion-modified Cellulose Fibers (A) | | Preparation Example | 2-1 (hot water treatment) | 2-1 (hot water treatment) | 2-4 (hot water treatment) | 2-3 (long fibers) | 2-3 (long fibers) |
| | | Average Polymerization Degree | 89 | 89 | 187 | 387 | 387 |
| | | Anionic Group | —COOH | —COOH | —COOH | —COOH | —COOH |
| | | Anionic Group Content (mmol/g) | 1.3 | 1.3 | 1.5 | 1.5 | 1.5 |
| Polyamine (B-1) | | Solvent | ethyl acetate | ethyl acetate | ethyl acetate | DMF | ethyl acetate |
| | | Kind | D-2000 | D-2000 | D-2000 | D-2000 | ED600 |
| | | Weight-average Molecular Weight | 2000 | 2000 | 2000 | 2000 | 600 |
| | | Introduction Ratio (%) | 10 | 10 | 10 | 100 | 100 |
| Monoamine (B-2) having reactive functional group | | Solvent | — | — | — | — | — |
| | | Kind | | | | | |
| | | Molecular Weight | | | | | |
| | | Introduction Ratio (%) | | | | | |
| Monoamine (C-1) not having reactive functional group | | Kind | TPMA | M-2070 | M-2070 | | |
| | | Molecular Weight | 259 | 2000 | 2000 | — | — |
| | | Introduction Ratio (%) | 60 | 90 | 90 | — | — |
| Monoamine (C-2) not having reactive functional group | | Kind | M-2070 | — | — | — | — |
| | | Weight-average Molecular Weight | 2000 | | | | |
| | | Introduction Ratio (%) | 30 | — | — | — | — |
| | | Proportion of Introduction Ratio of Monoamine not having reactive functional group*1 | 9 | 9 | 9 | 0 | 0 |
| Ratio by mass | | (B-1)/(A) | 0.3 | 0.3 | 0.3 | 3.0 | 0.9 |
| | | (B-2)/(A) | — | — | — | — | — |
| | | (C-1)/(A) | 0.2 | 2.3 | 2.7 | — | — |
| | | (C-2)/(A) | 0.8 | — | — | — | — |
| Dispersion of Cellulose Fiber Composite | | Cellulose Content (mass %)*2 | 0.5 | 0.5 | 0.5 | 0.5 | 0.5 |
| | | Dispersion Stability | A | A | A | C | C |
| | | Light Transmittance Rate (%) | 76 | 75 | 82 | 0 | 0 |

*1Proportion of (introduction ratio of monoamine not having reactive functional group/total introduction ratio of polyamine and monoamine having reactive functional group)
*2Content of cellulose fibers not containing modifying group From Table 4 and Table 5, it is known that, in the dispersions containing a cellulose fiber composite in which the anion-modified cellulose fibers have an average polymerization degree of 300 or less, the cellulose fiber composite does not aggregate, and therefore the dispersions thereof are excellent in dispersion stability and have high transparency. On the other hand, in the case of using an anion-modified cellulose fiber composite having an average polymerization degree of more than 300, the cellulose fiber composite aggregates, and the dispersions thereof have extremely poor transparency.

Example 2-26

20 g of the fine cellulose fiber composite dispersion dispersed in ethyl acetate obtained in Example 2-22 (1 g of fine cellulose fibers) and 10 g, as an absolute dry mass, of a matrix resin of an acrylic resin monomer (manufactured by Toagosei Co., Ltd., trade name: Arontack S-1511X, viscosity 4000 mPa·s) were mixed, and stirred for 3 minutes and defoamed for 3 minutes, using a rotation/revolution type stirrer (manufactured by Thinky Corporation, trade name: Awatori Neritaro). Subsequently, a resin composition containing a fine cellulose fiber composite was obtained (content of cellulose fibers: 1% by mass relative to the monomer). The light transmission rate of the resultant resin monomer composition was 41%. The results are shown in Table 6.

Examples 2-27 to 2-29, Comparative Example 2-4

Monomer compositions of a fine cellulose fiber composite blended in various resins (content of composite: 1% by mass relative to monomer) were produced in the same manner as in Example 2-26, except that in Example 2-26, the kind of the fine cellulose fiber composite dispersion and the matrix resin to be used were changed as in the combinations shown in Table 6. The results are shown in Table 6.

Examples 2-30 to 2-35, Comparative Example 2-5

Monomer compositions of a fine cellulose fiber composite blended in various matrix components (content of composite: 1% by mass relative to the monomer) were produced in the same manner as in Example 2-26, except that in Example 2-26, an epoxy monomer (manufactured by Mitsubishi Chemical Corporation, bisphenol F-type liquid-type, trade name: jER807, viscosity 6300 mPa·s) was used as the matrix component, and the kind of the fine cellulose fiber composite dispersion to be used was changed as in the combinations shown in Table 6. The results are shown in Table 6.

TABLE 6

|  | Example | | | | Comparative Example | Example |
| --- | --- | --- | --- | --- | --- | --- |
|  | 2-26 | 2-27 | 2-28 | 2-29 | 2-4 | 2-30 |
| Resin Monomer | acrylic monomer | acrylic monomer | acrylic monomer | acrylic monomer | acrylic monomer | epoxy monomer |
| Preparation Example for Cellulose Fiber Composite Dispersion | Example 2-22 | Example 2-23 | Example 2-24 | Example 2-25 | Comparative Example 2-3 | Example 2-5 |
| Average Polymerization Degree*1 | 89 | 89 | 89 | 89 | 387 | 89 |
| Amine Introduction Ratio (%)*2 | 20 | 10 | 10 | 10 | 100 | 100 |
| Light Transmission Rate of Monomer Composition (%) | 41 | 69 | 89 | 89 | 2 | 87 |

|  | Example | | | | | Comparative Example |
| --- | --- | --- | --- | --- | --- | --- |
|  | 2-31 | 2-32 | 2-33 | 2-34 | 2-35 | 2-5 |
| Resin Monomer | epoxy monomer | epoxy monomer | epoxy monomer | epoxy monomer | epoxy monomer | epoxy monomer |
| Preparation Example for Cellulose Fiber Composite Dispersion | Example 2-13 | Example 2-17 | Example 2-18 | Example 2-19 | Example 2-20 | Comparative Example 2-2 |
| Average Polymerization Degree*1 | 89 | 89 | 89 | 89 | 89 | 387 |
| Amine Introduction Ratio (%)*2 | 20 | 20 | 20 | 20 | 20 | 100 |
| Light Transmission Rate of Monomer Composition (%) | 98 | 98 | 98 | 98 | 98 | 1 |

*1Average polymerization degree of anion-modified cellulose fibers (A)
*2Introduction ratio of at least one amine selected from polyamine and monoamine having reactive functional group (%) = [amount of at least one amine selected from polyamine and reactive functional group-having monoamine bonding to the anionic group introduced into cellulose fiber surfaces (mmol/g)/content of the anionic group introduced into cellulose fiber surfaces (mmol/g)] × 100 (1)

From Table 6, it is known that the monomer compositions containing a cellulose fiber composite, in which the average polymerization degree of the anion-modified cellulose fibers is 300 or less, are free from cellulose fiber composite aggregation, and therefore the monomer compositions have high transparency. On the other hand, in the case of using an anion-modified cellulose fiber having an average polymerization degree of more than 300, the cellulose fiber composite aggregates, and the monomer compositions have extremely poor transparency.

Examples 2-36 to 2-37, Comparative Example 2-6

(Production of Resin Molded Article)

4 g of a dispersion prepared by dispersing the fine cellulose fiber composite obtained in Example 2-17 in DMF (fine cellulose fibers 0.2 g), 2 g of a matrix resin of a polystyrene resin (manufactured by Sigma Aldrich Corporation, number-average molecular weight 170,000, Production Number 441147-1KG), and 30 g of DMF were mixed, and stirred with a magnetic stirrer at room temperature (25° C.) for 2 hours to give a resin solution. The resultant solution was cast into a glass laboratory dish having a diameter of 9 cm, and dried at 90° C. for 12 hours to give a resin molded article containing the fine cellulose fiber composite.

The properties of the resultant, fine cellulose fiber-containing, resin molded article were evaluated according to the method of the following Test Example 2-3. The results are shown in Table 7.

Test Example 2-3 (Evaluation of Transparency)

Using a haze meter (manufactured by Murakami Color Research Laboratory, trade name: HM-150 Model), the haze value of the resultant resin molded article was measured. A resin molded article having a lower haze value is more transparent.

TABLE 7

|  | Example | | Comparative Example |
| --- | --- | --- | --- |
|  | 2-36 | 2-37 | 2-6 |
|  | Resin | | |
|  | polystyrene resin | polystyrene resin | polystyrene resin |
|  | Preparation Example for cellulose fiber composite dispersion | | |
|  | Example 2-17 | Example 2-19 | Comparative Example 2-2 |
| Average Polymerization Degree*1 | 89 | 89 | 387 |
| Amine Introduction ratio(%)*2 | 20 | 20 | 100 |
| Haze of resin molded article (%) | 5 | 5 | 27 |

*1Average polymerization degree of anion-modified cellulose fiber (A)
*2Same as in the footnote in Table 6

From Table 7, it is known that the resin molded articles containing a cellulose fiber composite, in which the average polymerization degree of the anion-mollified cellulose is 300 or less, are free from cellulose fiber composite aggregation, and therefore the resin molded articles have high transparency. On the other hand, in the case of using an anion-modified cellulose composite having an average polymerization degree of more than 300, the cellulose fiber composite aggregates, and the resin molded articles have extremely poor transparency.

Example 2-38 (Production of Resin Molded Article)

(1) Preparation of Photocurable Film Precursor Composition with Fine Cellulose Fiber Composite Dispersed Therein An ethanol dispersion of a fine cellulose fiber composite (cellulose fiber content 0.5% by mass) was produced in the same manner as in Example 2-18, except that the introduction ratio of 2-dimethylaminoethyl acrylate was 60%, the introduction ratio of Jeffamine M-2070 (C-1) was 30%, and the dispersion medium was changed to ethanol. 40 g of the resultant dispersion (fine cellulose fibers 0.2 g) and 5 g of an acrylic monomer (manufactured by FUJIFILM Wako Pure Chemical Corporation, 4-acryloylmorpholine) were mixed, and stirred with a magnetic stirrer at room temperature (25° C.) for 2 hours to give a monomer solution. Ethanol was evaporated away from the resultant solution using an evaporator to give a dispersion of fine cellulose fiber composite dispersed in 4-acryloylmorpholine.

1.60 g of an urethane acrylate compound (manufactured by Mitsubishi Chemical Corporation, Shikoh UV-7000B) was mixed in 4.02 g of the resultant dispersion (4-acryloylmorpholine 3.73 g), and stirred with a magnetic stirrer at room temperature (25° C.) for 2 hours, and thereafter 0.20 g of 1-hydroxycyclohexyl phenyl ketone was added and further stirred to give a photocurable film precursor composition with a fine cellulose fiber composite dispersed therein.

(2) Production of Resin Molded Article

The precursor composition prepared in the above (1) was applied onto a PET film (manufactured by Toray Corporation, Lumirror T60-75 µm) so that the film thickness before curing could be 100 µm, according to a bar coating method, and using a UV irradiator (manufactured by EYE GRAPHICS Corporation, EYE INVERTOR GRANDAGE), this was processed in 2 passes each at 4 kW, at a height of 150 mm and at a speed of 246 cm/min to give a photocured film (resin molded article) containing a fine cellulose fiber composite dispersed therein (fine cellulose fibers: 2.8% by mass). The radiant illumination was about 24 mW/cm$^2$, the irradiance level was about 580 mJ/cm$^2$. The thickness of the resultant cured film was about 67 µm.

Reference Example 2-1

(Production of Resin Molded Article)

A cured film (resin molded article) not containing a fine cellulose fiber composite was produced in the same manner as in Example 2-38 except that 3.73 g of 4-acryloylmorpholine and 1.60 g of the urethane acrylate compound (UV-7000B) were mixed to give a photocurable film precursor composition. The thickness of the resultant cured film was about 76 µm.

Test Example 2-4 (Evaluation of Reinforcement of Resin Molded Article)

A dumbbell-shaped test piece (JIS K 6251, dumbbell No. 7) was formed. Using an autograph (manufactured by Shimadzu Corporation, autograph precision universal tester, AGS-10kNX), the tensile elastic modulus and the tensile strength of the dumbbell-shaped test piece were measured in a tensile test at a tension rate of 1 mm/min. Larger values of the two mean a higher mechanical strength.

Table 8 shows a relative value based on the numerical value of 100 in Reference Example 2-1 as a reference value.

Example 2-39 (Production of Resin Molded Article)

(1) Preparation of Resin Composition with Fine Cellulose Fiber Composite Dispersed Therein Water in the shortened anion-modified cellulose fibers prepared in Preparation Example 1 was substituted with DMF, and 0.4 g, as an absolute dry mass, of the resultant anion-modified cellulose fibers were put into a beaker equipped with a magnetic stirrer and a stirring bar. Subsequently, 0.13 g of Jeffamine M-2070 and 0.045 g of diallylamine were added, and dissolved in 80 g of DMF, and stirred at room temperature (25° C.) for 1 hour. Afterwards, 8.0 g of an epoxy resin (manufactured by Mitsubishi Chemical Corporation, jER828) was added and further stirred at room temperature (25° C.) for 1 hour, and the resultant suspension was disintegrated with a high-pressure homogenizer for a total of 5 passes under 150 MPa. DMF in the resultant resin solution was completely evaporated away with an evaporator to give a resin composition containing a fine cellulose fiber composite dispersed therein.

(2) Production of Resin Molded Article 0.5 g of dicyandiamide (polyaddition-type curing agent) and 0.3 g of 3-(3,4-dichlcorophenyl)-1,1-dimethylurea (curing accelerator, manufactured by Hodogaya Chemical Co., Ltd.: DCMU99) were added to 10.0 g of the resin composition prepared in the above (1), and, using a rotation/revolution type stirrer (manufactured by Thinky Corporation, trade name: Awatori Neritaro), stirred for 2 minutes and defoamed for 2 minutes at room temperature (25° C.) to give a mixture of a resin composition and a curing agent.

Using an applicator, the resultant mixture (coating liquid) was applied onto a copper foil (thickness 18 µm, manufactured by Furukawa Electric Co., Ltd.) in a coating thickness of 1.0 mm. This was dried at 80° C. for 1 hour to remove the solvent, and then thermally cured at 150° C. for 1 hour to give a resin molded article (coating film) containing a fine cellulose fiber composite dispersed therein. The thickness of the resultant cured film was 137 µm.

Reference Example 2-2

A resin molded article not containing a fine cellulose fiber composite was produced in the same manner as in Example 2-39 except that, in Example 2-39(2), 10.0 g of an epoxy resin (manufactured by Mitsubishi Chemical Corporation, jER828) was used in place of the resin composition. The thickness of the resultant cured film was 129 µm.

In Table 8, a relative value is shown, based on the numerical value of 100 in Reference Example 2-2 as a reference value.

TABLE 8

| | | Example 2-38 | Reference Example 2-1 | Example 2-39 | Reference Example 2-2 |
|---|---|---|---|---|---|
| Anion-modified Cellulose Fibers (A) | Preparation Example | 1 (hot water treatment) | — | 1 (hot water treatment) | — |
| | Average Polymerization Degree | 89 | — | 89 | — |
| | Anionic Group | —COOH | — | —COOH | — |
| | Anionic Group Content (mmol/g) | 1.3 | — | 1.3 | — |
| Monoamine having reactive functional group (B-2) | Kind | 2-DMAEA | — | DAA | — |
| | Molecular Weight | 143 | — | 97 | — |
| | Introduction Ratio (%) | 60 | — | 85 | — |
| Monoamine not having reactive functional group (C-1) | Kind | M-2070 | — | M-2070 | — |
| | Molecular Weight | 2000 | — | 2000 | — |
| | Introduction Ratio (%) | 30 | — | 15 | — |
| Ratio by mass | (B-2)/(A) | 0.1 | — | 0.1 | — |
| | (C-1)/(A) | 0.8 | — | 0.4 | — |
| Proportion of Introduction Ratio of Monoamine not having reactive functional group *1 | | 0.5 | — | 0.2 | — |
| Resin Molded Article | Matrix Resin | 4-acryloyl-morpholine urethane acrylate | | epoxy resin | |
| | Content of fine cellulose fibers (% by mass, relative to resin) | 2.8 | 0 | 5 | 0 |
| Evaluation Results | Tensile Elastic Modulus | 124 | 100 | 108 | 100 |
| | Tensile Strength | 115 | 100 | 145 | 100 |

*1 Proportion of (introduction ratio of monoamine not having reactive functional group/total introduction ratio of polyamine and monoamine having reactive functional group)

From Table 8, it is known that the resin molded articles containing a cellulose fiber composite, in which the average polymerization degree of the anion-modified cellulose is 300 or less, are free from cellulose fiber composite aggregation, and therefore the resin molded articles have high mechanical strength.

INDUSTRIAL APPLICABILITY

The cellulose fiber composite of the present invention has high dispersibility and high viscosity increase performance and a dispersion thereof has high transparency, and therefore the composite is favorably used for various industrial applications such as daily necessities, household appliance parts, wrapping materials for household appliance parts, and automobile parts.

The invention claimed is:

1. A cellulose fiber composite, comprising anion-modified cellulose fibers to which at least one amine is bonded, wherein:
the at least one amine is at least one selected from the group consisting of a polyamine and a monoamine having a reactive functional group; and
the cellulose fiber composite satisfies requirement 2:
requirement 2: an average polymerization degree of the anion-modified cellulose fibers is 180 or less.

2. The cellulose fiber composite according to claim 1, wherein an average aspect ratio of the anion-modified cellulose fibers is 200 or less.

3. The cellulose fiber composite according to claim 1, wherein:
the at least one amine comprises the polyamine; and
the polyamine is at least one selected from the group consisting of a diamine and a triamine.

4. The cellulose fiber composite according to claim 1, wherein:
the at least one amine comprises the polyamine; and
the polyamine comprises an oxyalkanediyl group.

5. The cellulose fiber composite according to claim 1, wherein:
the at least one amine comprises the polyamine; and
the polyamine is at least one selected from the group consisting of an aliphatic primary diamine and an aliphatic primary triamine.

6. The cellulose fiber composite according to claim 1, wherein:
the at least one amine comprises the monoamine having a reactive functional group; and
the reactive functional group is at least one selected from the group consisting of an epoxy group, a carboxy group, a hydroxy group, a thiol group, an allyl group, an alkenyl group, and an acryloyl group.

7. The cellulose fiber composite according to claim 1, wherein the anion-modified cellulose fibers are further bonded to a monoamine not having a reactive functional group.

8. The cellulose fiber composite according to claim 7, wherein the monoamine not having a reactive functional group comprises an oxyalkanediyl group.

9. The cellulose fiber composite according to claim 7, wherein a proportion of an introduction ratio of the monoamine not having a reactive functional group to a total introduction ratio of the polyamine and the monoamine having a reactive functional group (introduction ratio of monoamine not having a reactive functional group/total introduction ratio of polyamine and monoamine having a reactive functional group) is 0.01 or more and 10 or less.

10. The cellulose fiber composite according to claim 1, wherein an average fiber length of the anion-modified cellulose fibers is 2500 μm or less.

11. The cellulose fiber composite according to claim 1, wherein the anion-modified cellulose fibers comprise cellulose fibers to which a carboxy group has been introduced.

12. The cellulose fiber composite according to claim 1, wherein an average aspect ratio of the cellulose fiber composite is 200 or less.

13. The cellulose fiber composite according to claim 1, wherein an average fiber length of the cellulose fiber composite is 900 nm or less.

14. A dispersion, comprising the cellulose fiber composite according to claim 1 dispersed in a medium.

15. A resin composition produced by blending the cellulose fiber composite according claim 1.

16. A molded article produced by molding the cellulose fiber composite according to claim 1.

17. A method for producing the cellulose fiber composite according to claim 1, comprising mixing anion-modified cellulose fibers and at least one amine selected from the group consisting of a polyamine and a monoamine having a reactive functional group.

18. The method according to claim 17, further comprising performing a disintegration treatment.

19. The cellulose fiber composite according to claim 7, wherein the monoamine not having a reactive functional group comprises at least one selected from the group consisting of a hydrocarbon group and a polyether group.

20. The cellulose fiber composite according to claim 1, wherein:
- the at least one amine comprises the monoamine having a reactive functional group; and
- the reactive functional group is at least one selected from the group consisting of an epoxy group, a carboxy group, a thiol group, an allyl group, an alkenyl group, and an acryloyl group.

\* \* \* \* \*